(12) United States Patent
Diaconescu et al.

(10) Patent No.: US 8,762,130 B1
(45) Date of Patent: *Jun. 24, 2014

(54) SYSTEMS AND METHODS FOR NATURAL LANGUAGE PROCESSING INCLUDING MORPHOLOGICAL ANALYSIS, LEMMATIZING, SPELL CHECKING AND GRAMMAR CHECKING

(75) Inventors: Stefan Stelian Diaconescu, Bucharest (RO); Ionut Mihai Dumitrascu, Buzau (RO); Cristi Iulian Ingineru, Rosiori de Vede (RO); Oana-Adriana Bulibasa, Letea-Veche (RO); Monica Mihaela Rizea, Bucharest (RO); Bianca-Daniela Paun, Bucharest (RO)

(73) Assignee: Softwin SRL Romania, Bucharest (RO)

( * ) Notice: Subject to any disclaimer, the term of this patent is extended or adjusted under 35 U.S.C. 154(b) by 1197 days.

This patent is subject to a terminal disclaimer.

(21) Appl. No.: 12/486,546

(22) Filed: Jun. 17, 2009

(51) Int. Cl.
*G06F 17/27* (2006.01)
*G06F 17/28* (2006.01)
*G06F 17/21* (2006.01)

(52) U.S. Cl.
USPC ................................ 704/9; 704/7; 704/10

(58) Field of Classification Search
USPC .................................. 704/7, 9, 10
See application file for complete search history.

(56) References Cited

U.S. PATENT DOCUMENTS

| | | | |
|---|---|---|---|
| 4,420,817 A * | 12/1983 | Yoshida | 704/6 |
| 4,586,160 A | 4/1986 | Amano | |
| 4,594,686 A * | 6/1986 | Yoshida | 704/8 |
| 4,641,264 A | 2/1987 | Nitta | |
| 4,706,212 A | 11/1987 | Toma | |
| 4,724,523 A | 2/1988 | Kucera | |
| 4,783,761 A | 11/1988 | Gray | |
| 4,864,501 A | 9/1989 | Kucera et al. | |
| 4,887,212 A | 12/1989 | Zamora | |
| 4,914,590 A | 4/1990 | Loatman | |
| 4,916,614 A | 4/1990 | Kaji | |
| 4,980,829 A | 12/1990 | Okajima | |
| 4,994,966 A | 2/1991 | Hutchins | |

(Continued)

FOREIGN PATENT DOCUMENTS

| EP | 0012777 A1 | 7/1980 |
|---|---|---|
| EP | 0230340 A2 | 7/1987 |

(Continued)

OTHER PUBLICATIONS

Diaconescu, S., Natural Language Agreement Description for Reversible Grammars, in Tamás D. Gedeon, Lance Chun Che Fung (Eds.), AI 2003: Advances in Artificial Intelligence, 16th Australian Conference on AI, Perth, Australia, Dec. 2003, Proceedings, pp. 161-172.

(Continued)

*Primary Examiner* — Richemond Dorvil
*Assistant Examiner* — Olujimi Adesanya
(74) *Attorney, Agent, or Firm* — Law Office of Andrei D Popovici, PC

(57) ABSTRACT

In some embodiments, a linguistic application exploits a linguistic knowledgebase (LKB) including, among others, lexicon data, inflection form data, and syntax data for a natural language such as English or Romanian. The application employs a set modules including a word retriever, a form generator, and a syntax checker, which are interconnected to perform a number of higher-level text-processing operations such as synthetic and analytic annotation, lemmatizing, spell checking, and grammar checking.

19 Claims, 24 Drawing Sheets

(56) References Cited

U.S. PATENT DOCUMENTS

| | | | |
|---|---|---|---|
| 5,060,155 A | 10/1991 | van Zuijlen | |
| 5,088,038 A * | 2/1992 | Tanaka et al. | 704/2 |
| 5,251,129 A | 10/1993 | Jacobs et al. | |
| 5,323,316 A | 6/1994 | Kadashevich | |
| 5,369,576 A * | 11/1994 | Heemels et al. | 704/9 |
| 5,442,546 A | 8/1995 | Kaji | |
| 5,528,491 A | 6/1996 | Kuno | |
| 5,559,693 A * | 9/1996 | Anick et al. | 704/9 |
| 5,642,519 A | 6/1997 | Martin | |
| 5,659,765 A | 8/1997 | Nii | |
| 5,748,841 A | 5/1998 | Morin | |
| 5,983,169 A | 11/1999 | Kozma | |
| 5,991,712 A | 11/1999 | Martin | |
| 6,101,492 A * | 8/2000 | Jacquemin et al. | 707/688 |
| 6,243,669 B1 * | 6/2001 | Horiguchi et al. | 704/9 |
| 6,332,118 B1 | 12/2001 | Yamabana | |
| 6,676,412 B1 * | 1/2004 | Masterson et al. | 434/169 |
| 6,937,975 B1 | 8/2005 | Elworthy | |
| 7,013,264 B2 | 3/2006 | Dolan | |
| 7,050,964 B2 | 5/2006 | Menzes | |
| 7,085,708 B2 | 8/2006 | Manson | |
| 7,136,807 B2 | 11/2006 | Mueller | |
| 7,167,824 B2 | 1/2007 | Kallulli | |
| 7,324,936 B2 | 1/2008 | Saldanha et al. | |
| 7,562,005 B1 * | 7/2009 | Bangalore et al. | 704/1 |
| 7,565,281 B2 | 7/2009 | Appleby | |
| 7,698,124 B2 | 4/2010 | Menezes et al. | |
| 2002/0013694 A1 | 1/2002 | Murata et al. | |
| 2002/0026308 A1 | 2/2002 | Osborne | |
| 2002/0042707 A1 | 4/2002 | Zhao | |
| 2003/0023423 A1 | 1/2003 | Yamada | |
| 2003/0067498 A1 * | 4/2003 | Parisi | 345/853 |
| 2003/0233226 A1 | 12/2003 | Kim | |
| 2004/0153305 A1 | 8/2004 | Enescu | |
| 2004/0172237 A1 | 9/2004 | Saldanha | |
| 2004/0230418 A1 | 11/2004 | Kitamura | |
| 2004/0243387 A1 | 12/2004 | De Brabander | |
| 2004/0243396 A1 | 12/2004 | Liu et al. | |
| 2005/0091031 A1 | 4/2005 | Powell et al. | |
| 2005/0091036 A1 | 4/2005 | Shackleton | |
| 2006/0009962 A1 | 1/2006 | Monk | |
| 2006/0200336 A1 | 9/2006 | Cipollone | |
| 2006/0200338 A1 | 9/2006 | Cipollone et al. | |
| 2007/0010994 A1 | 1/2007 | Mueller | |
| 2007/0233460 A1 * | 10/2007 | Lancaster et al. | 704/9 |
| 2008/0177531 A1 * | 7/2008 | Nakagawa | 704/9 |
| 2008/0235199 A1 | 9/2008 | Li et al. | |
| 2009/0006078 A1 * | 1/2009 | Selegey et al. | 704/9 |

FOREIGN PATENT DOCUMENTS

| | | |
|---|---|---|
| EP | 0241717 A2 | 10/1987 |
| EP | 0262938 A1 | 4/1988 |
| EP | 0274281 A1 | 7/1988 |
| EP | 0357370 A2 | 3/1990 |
| EP | 0381288 A1 | 8/1990 |
| EP | 0387960 A1 | 9/1990 |
| EP | 0409425 A2 | 1/1991 |
| EP | 0199464 B1 | 8/1991 |
| EP | 0466516 A2 | 1/1992 |
| EP | 0562818 A2 | 9/1993 |
| EP | 0168814 B1 | 5/1994 |
| EP | 0266001 B1 | 5/1995 |
| EP | 0244871 B1 | 2/1996 |
| EP | 0388156 B1 | 9/1997 |
| EP | 0805403 A2 | 11/1997 |
| EP | 0524694 B1 | 7/1999 |
| EP | 0651340 B1 | 12/1999 |
| EP | 0424032 B1 | 3/2000 |
| EP | 0525470 B1 | 4/2000 |
| EP | 1022662 A1 | 7/2000 |
| EP | 1109110 A9 | 6/2001 |
| EP | 0825531 B1 | 5/2002 |
| EP | 1209560 A1 | 5/2002 |
| EP | 0532338 B1 | 8/2002 |
| EP | 1262880 A2 | 12/2002 |
| EP | 1271340 A1 | 1/2003 |
| EP | 1349079 A1 | 10/2003 |
| EP | 1080424 B1 | 7/2006 |
| JP | 59032062 | 2/1984 |
| JP | 3276367 | 12/1991 |
| JP | 7152767 | 6/1995 |
| WO | 8805946 A1 | 8/1988 |
| WO | 9740452 A1 | 10/1997 |
| WO | 9962002 A1 | 12/1999 |

OTHER PUBLICATIONS

Diaconescu, S., Natural Language Processing Using Generative Indirect Dependency Grammar, in Mieczyslav A. Klopotek, Slawomir T. Wierzchon, Krzysztof Trojanowski (Eds), Intelligent Information Processing and Web Mining, Proceedings of the International IIS: IIPWM'04 Conference, Zakopane, Poland, May 17-20, 2004, Springer, pp. 414-418.

Diaconescu, S., Natural Language Understanding Using Generative Dependency Grammar, in Max Bramer, Alun Preece and Frans Coenen (Eds), ES 2002. Research and Development in Intelligent Systems XIX, Proceedings of ES2002, the Twenty second SGAI International Conference on Knowledge Based Systems and Applied Artificial Intelligence, Cambridge UK, Dec. 2002, Springer, pp. 439-452.

Diaconescu, S., Some Properties of the Attribute Value Trees Used for Linguistic Knowledge Representation, in 2nd Indian International Conference on Artificial Intelligence (IICAI-05) India during Dec. 20-22, 2005.

Diaconescu, S., Morphological Categorization Attribute Value Trees and XML, in Mieczyslav A. Klopotek, Slawomir T. Wierzchon, Kryzstof Trojanowski (Eds), Intelligent Information Processing and web Mining, Proceedings of the International IIS: IIPWM '03 Conference, Zakopane, Poland, Jun. 2-5, 2003, Springer, pp. 131-138.

Diaconescu, S., Multiword Expression Translation Using Generative Dependency Grammar, in proceedings of ESTAL 2004—Espana for Natural Language Processing, Oct. 20-22, 2004, Alicante, Spain.

Diaconescu, S.,General System for Normal and Phonetic Inflection, in Corneliu Burileanu, Horia-Nicolai Teodorescu (Eds.), From Speech Processing to Spoken Language Technology, The Publishing House of the Romanian Academy, Bucharest 2009, pp. 149-160.

Diaconescu, S., Natural Language Syntax Description using Generative Dependency Grammar, POLIBITS, No. 38, Jul.-Dec. 2008, ISSN:1870-9044, pp. 5-18.

Diaconescu, S., Complex Natural Language Processing System Architecture, in Corneliu Burileanu, Horia-Nicolai Teodorescu (Eds.), Advances in Spoken Language Technology, The Publishing House of the Romanian Academy, Bucharest 2007, pp. 228-240.

Diaconescu, S., Crearea resurselor lingvistice cu ajutorul unui limbaj specializat, in Workshop on Linguistic Resources and Tools for Romanian Language Processing, Iasi, Nov. 2006.

Diaconescu, S., Grammar Abstract Language Basics, in GEST International Transaction on Computer Science and Engineering, vol. 10, No. 1, 2005.

USPTO, Office Action mailed Oct. 17, 2011 for U.S. Appl. No. 12/109,885, filed Apr. 25, 2008.

Diaconescu et al., U.S. Appl. No. 12/109,885, filed Apr. 25, 2008.
Diaconescu et al., U.S. Appl. No. 12/486,597, filed Jun. 17, 2009.
Diaconescu et al., U.S. Appl. No. 12/486,629, filed Jun. 17, 2009.

* cited by examiner

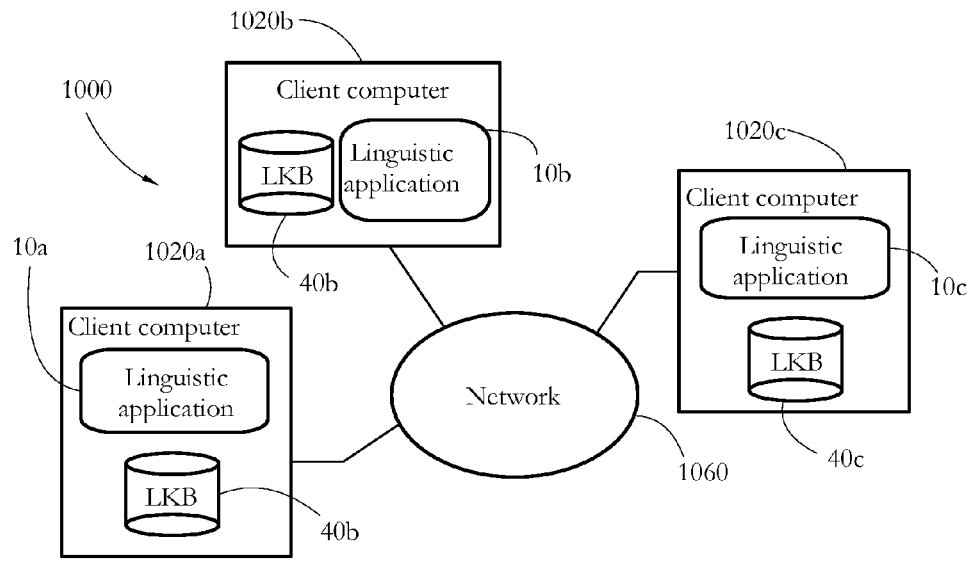
FIG. 23-A
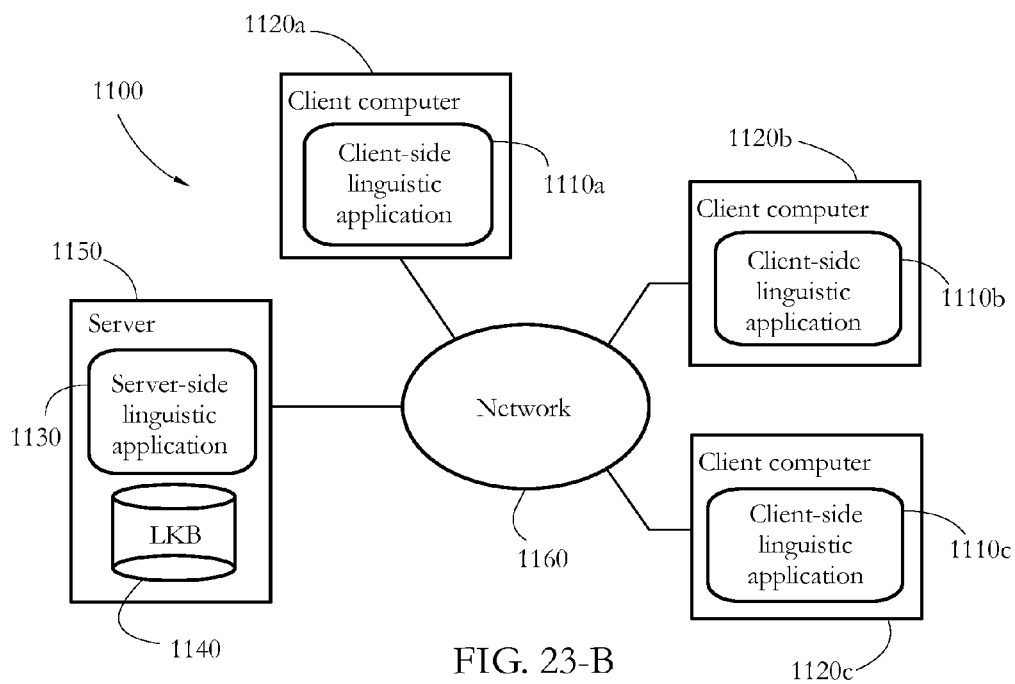
FIG. 23-B

```
Section Lexicon
Source language RUM
Source direction right
Exploitation language RUM
Exploitation direction right
```
```
Inflection situations
AdjMascNomSg:
    [class=adjective] [number=singular]
    [comparative degree=positive]
    [articulation=nonarticulate]
    [gender=masculine] [case=nominative]
AdjMascNomPl:
    [class=adjective] [number=plural]
    [comparative degree=positive]
    [articulation=nonarticulate]
    [gender=masculine] [case=nominative]
AdjFemNomSg:
    [class=adjective] [number=singular]
    [comparative degree=positive]
    [articulation=nonarticulate]
    [gender=feminine] [case=nominative]
AdjFemNomPl:
    [class=adjective] [number=plural]
    [comparative degree=positive]
    [articulation=nonarticulate]
    [gender=feminine] [case=nominative]
```
304

```
Entry0001: Entry word lemma
    Text "vesel"
    Phonetic "v'esel"
    Syllabification
        Euphonic "ve/sel"
        Phonetic "ve/sel"
    Gloss "cu voie buna, bine dispus"
    Synonym (Entry0020)/* "voios, bucuros" */
    Antonym (Entry0021)/* "trist"*/
    Etymology
        Language SLA Text "веселъ"
        Phonetic "veselu" Transliterate "veselu"
        Gloss "cu voie buna, bine dispus"
    Morphology
        Inflection situation AdjMascNomSg
        Inflection rule Flexiune_adj
```
302a

FIG. 25-A

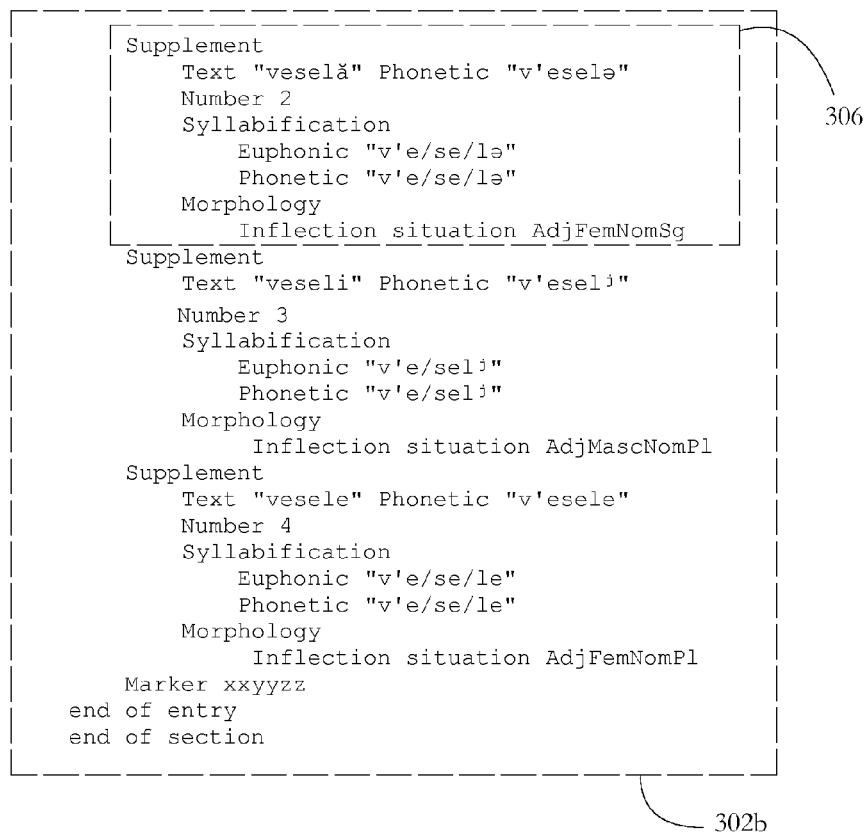
FIG. 25-B

```xml
<?xml version="1.0" encoding = "unicode"?>
<!DOCTYPE Lexicon SYSTEM "Lexicon.dtd">
<Lexicon sourceLanguage = "RUM" exploitationLanguage = "RUM"
sourceDirection =   "right" exploitationDirection = "right">
 <inflectionSituations>
  <situation label="AdjMascNomSg">
   <av attribute="class" value="adjective"></av>
   <av attribute="comparative degree" value="positive"></av>
   <av attribute="articulation" value="nonarticulate"></av>
   <av attribute="gender" value="masculine"></av>
   <av attribute="case" value="nominative"></av>
   <av attribute="number" value="singular"></av>
  </situation>
  <situation label="AdjMascNomPl">
   <av attribute="class" value="adjective"></av>
   <av attribute="comparative degree" value="positive"></av>
   <av attribute="articulation" value="nonarticulate"></av>
   <av attribute="gender" value="masculine"></av>
   <av attribute="case" value="nominative"></av>
   <av attribute="number" value="plural"></av>
  </situation>
  <situation label="AdjFemNomSg">
   <av attribute="class" value="adjective"></av>
   <av attribute="comparative degree" value="positive"></av>
   <av attribute="articulation" value="nonarticulate"></av>
   <av attribute="gender" value="feminine"></av>
   <av attribute="case" value="nominative"></av>
   <av attribute="number" value="singular"></av>
  </situation>
  <situation label="AdjFemNomPl">
   <av attribute="class" value="adjective"></av>
   <av attribute="comparative degree" value="positive"></av>
   <av attribute="articulation" value="nonarticulate"></av>
   <av attribute="gender" value="feminine"></av>
   <av attribute="case" value="nominative"></av>
   <av attribute="number" value="plural"></av>
  </situation>
 </inflectionSituations>

<entry label="Entry0001" type="WO">
  <lemma>
   <text>
    <normal>vesel</normal>
    <phonetic>ve'sel</phonetic>
   </text>
```

FIG. 26-A

```
<semantics>
    <gloss>cu voie buna, bine dispus</gloss>
    <synonym entryLabel="Entry0020"></synonym>
    <antonym entryLabel="Entry0021"></antonym>
</semantics>
    <etymology language="sla">
    <text>
     <normal>веселъ</normal>
     <phonetic>veselu</phonetic>
    </text>
    <transliterate>veselu</transliterate>
    <gloss>cu voie buna, bine dispus</gloss>
    </etymology>
    <sy>
    <es> <esy>ve/sel</esy></es>
    <ps> <psy>ve/sel</psy></ps>
    </sy>
    <morphology situationLabel="AdjMascNomSg">
     <inflectionRule label="Flexiune_adj"></inflectionRule>
    </morphology>
    <supplement number="2">
     <text>
      <normal>veselă</normal>
      <phonetic>v'eselə</phonetic>
     </text>
     <sy>
      <es> <esy>v'e/se/lə</esy> </es>
      <ps> <psy>v'e/se/lə</psy> </ps>
     </sy>
     <morphology situationLabel="AdjFemNomSg"></morphology>
    </supplement>
    <supplement number="3">
     <text>
      <normal>veseli</normal>
      <phonetic>v'eselʲ</phonetic>
     </text>
     <sy>
      <es> <esy>v'e/selʲ</esy> </es>
      <ps> <psy>v'e/selʲ</psy> </ps>
     </sy>
     <morphology situationLabel="AdjMascNomPl"></morphology>
    </supplement>
```

FIG. 26-B

```
Section inflection forms
Source language RUM
Exploitation language ENG
Source direction right
Exploitation direction right
```
```
ETF_Entry00000001_1:
Entry Text "un băiat"
    Phonetic "'un bəj'at"
    Reference Entry00000001
        [class = noun]
        [type noun = common]
        [animate = inanimate]
        [gender = masculine]
        [number = singular]
        [case = nominative]
        [article = indefinite]
    Tri 1 left Central word
        Text "băiat"
        Phonetic "bəj'at"
            [class = noun]
            [type noun = common]
            [animate = inanimate]
            [gender = masculine]
            [case = nominative]
            [number = singular]
            [article = nonarticulate]

Auxiliary words
        Text "un"
        Phonetic "'un"
        Reference Art01
            [class = article]
            [type article = indefinite]
            [case = nominative]
            [gender = masculine]
            [number = singular]
        Belongs = no @acord-art@ end of entry
```

```
Section Syntax
Source language RUM
Exploitation language ENG
Source direction right
Exploitation direction right
```
```
┌─────────────────────────────────────────┐
│ Rule Rule1:                             │
│    <n0> ::=                             │
│        Alternant A1:                    │
│           Syntax                        │
│              E1: <n1>                   │
│                 Governor R1             │
│              E2: <n2>                   │
│                 Subordinate R1          │
│                 Governor R3             │
│            * E3: <n3>                   │
│                 Subordinate R3          │
│              "." !                      │
│           Dependencies                  │
│              R1: @r1@                   │
│              R2: @r2@                   │
│              R3: @r3@                   │
└─────────────────────────────────────────┘ — 502
```
```
Rule Rule2:
   <n3> ::=
       Alternant A1:
          Syntax
             E3.1: <n3.1>
                Governor R4
             E4: <n4>
                Subordinate R4
          Dependecies
             R4: @r4@
       Alternant A2:
          Syntax
             E3.2: <n3.2>
                Governor R6
             E6: <n6>
                Subordinate R6
                Governor R7
             E7: <n7>
                Subordinate R7
          Dependecies
             R6: @r6@
             R7: @r7@
```

FIG. 29

SYSTEMS AND METHODS FOR NATURAL LANGUAGE PROCESSING INCLUDING MORPHOLOGICAL ANALYSIS, LEMMATIZING, SPELL CHECKING AND GRAMMAR CHECKING

BACKGROUND

The invention relates to methods and systems for computer processing of natural languages.

Commercial interest in computer-based human language processing has been steadily increasing in recent years. Globalization and the widespread use of the Internet are driving the development of automated translation technology, while progress in robotics and software engineering is fueling growth in the area of human-machine interfaces, voice-activated applications, and automated document processing.

Common approaches to natural language processing include dictionary-based, example-based, and corpus-based methods. Dictionary work involves the creation of lexical knowledge bases. Example-based methods aim to create large collections of example phrases, and to match incoming text to the stored examples. Corpus-based work often employs statistical models of relationships between words and other linguistic features.

Language processing applications such as spell checkers and grammar checkers are often accompanied by application-specific LKBs. The format of such LKBs may vary significantly among applications, languages, and providers.

SUMMARY

According to one aspect, a system comprises a linguistic knowledgebase (LKB) for a natural language, a computer-implemented word retriever connected to the LKB, a computer-implemented form generator connected to the word retriever, a computer-implemented synthetic annotator connected to the word retriever, and a computer-implemented syntax checker connected to the synthetic annotator. The LKB comprises a set of computer-readable lexicon declarations, a set of computer-readable inflected form declarations, and a set of computer-readable syntax rule declarations. The computer-implemented word retriever is configured to receive a first word, perform a lookup of an inflected form declaration of the first word in the LKB, perform a lookup of a lexicon declaration of the first word in the LKB in response to performing the lookup of the inflected form declaration, and determine a first word interpretation of the first word according to the lexicon declaration and the inflected form declaration. The first word interpretation comprises a lemma of the first word and an inflection indicator of the first word. The computer-implemented form generator is configured to receive a second word not necessarily distinct from the first word, produce a first set of words, each word of the first set of words having a predetermined spelling similarity to the second word, and for each word of the first set of words, receive from the word retriever a second word interpretation of said each word of the first set of words. The computer-implemented synthetic annotator is configured to receive a word sequence, receive from the word retriever a third word interpretation of each word of the word sequence, and determine a synthetic annotation of the word sequence, the synthetic annotation comprising the third word interpretation of said each word of the word sequence. The computer-implemented syntax checker is configured to receive the synthetic annotation from the synthetic annotator, perform a lookup of a syntax rule declaration of the word sequence in the LKB according to the synthetic annotation, and perform a syntactic analysis of the word sequence according to the syntax rule declaration, to determine a synthetic dependency tree of the word sequence.

According to another aspect, a system comprises a linguistic knowledgebase (LKB) for a natural language, a computer-implemented word retriever connected to the LKB, and a computer-implemented syntax checker connected to the word retriever. The LKB comprises a set of computer-readable lexicon declarations, a set of computer-readable inflected form declarations, and a set of computer-readable syntax rule declarations. The computer-implemented word retriever is configured to perform a lookup of an inflected form declaration of each word of a word sequence, and a lookup of a lexicon declaration of said each word in the LKB. The computer-implemented syntax checker is configured to perform a lookup of a syntax rule declaration in the LKB according to the inflected form declaration of said each word, and perform a syntactic analysis of the word sequence, to produce a synthetic dependency tree of the word sequence.

BRIEF DESCRIPTION OF THE DRAWINGS

The foregoing aspects and advantages of the present invention will become better understood upon reading the following detailed description and upon reference to the drawings where:

FIG. 23-A shows an exemplary linguistic knowledgebase (LKB) expoitation system including multiple client computers, each having a linguistic application and a linguistic knowledgebase, according to some embodiments of the present invention.

FIG. 23-B shows and exemplary LKB exploitation system, including a server computer capable of interacting with multiple client computers, according to some embodiments of the present invention.

FIG. 25-A shows a first part of an exemplary Grammar Abstract Language (GAL) encoding of a lexicon declaration according to some embodiments of the present invention.

FIG. 25-B shows a second part of the GAL encoding of FIG. 25-A.

FIG. 26-A shows a first part of an exemplary Extensible Markup Language (XML) encoding of the lexicon declaration of FIGS. 25A-B, according to some embodiments of the present invention.

FIG. 26-B shows a second part of the XML encoding of FIG. 26-A.

FIG. 27 shows an exemplary GAL encoding of an inflection form declaration according to some embodiments of the present invention.

FIG. 29 shows an exemplary GAL encoding of a syntax rule declaration according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. A plurality of elements includes two or more elements. Any recitation of an element is understood to refer to at least one element. The statement that a first element comprises at least one of a second element and a third element is understood to mean that the first element comprises the second element alone, or the third element alone, or both the second and third elements. Any recitation of the modifier "or" is understood as "nonexclusive or." Unless otherwise required, any described method steps need not be necessarily performed in a particular illustrated order. A first element (e.g. data) derived from a second element encompasses a first element equal to the second element, as well as a first element generated by processing the second element and optionally other data. Unless otherwise specified, the term "program" encompasses both stand-alone programs and software routines that form part of larger programs. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer readable media encompass storage media such as magnetic, optic, and semiconductor media (e.g. hard drives, optical disks, flash memory, DRAM), as well as communications links such as conductive cables and fiber optic links. A synthetic inflected form comprises a single word (e.g. be, cars, looked, writing, faster). An analytic inflected form comprises a plurality of words (e.g. have been thinking, more beautiful). A synthetic dependency tree of a word sequence is a linguistic dependency tree having synthetic inflected forms of the word sequence as nodes. An analytic dependency tree of a word sequence is a linguistic dependency tree wherein selected nodes represent analytic inflected forms of the word sequence.

The following description illustrates embodiments of the invention by way of example and not necessarily by way of limitation.

Figure 1:
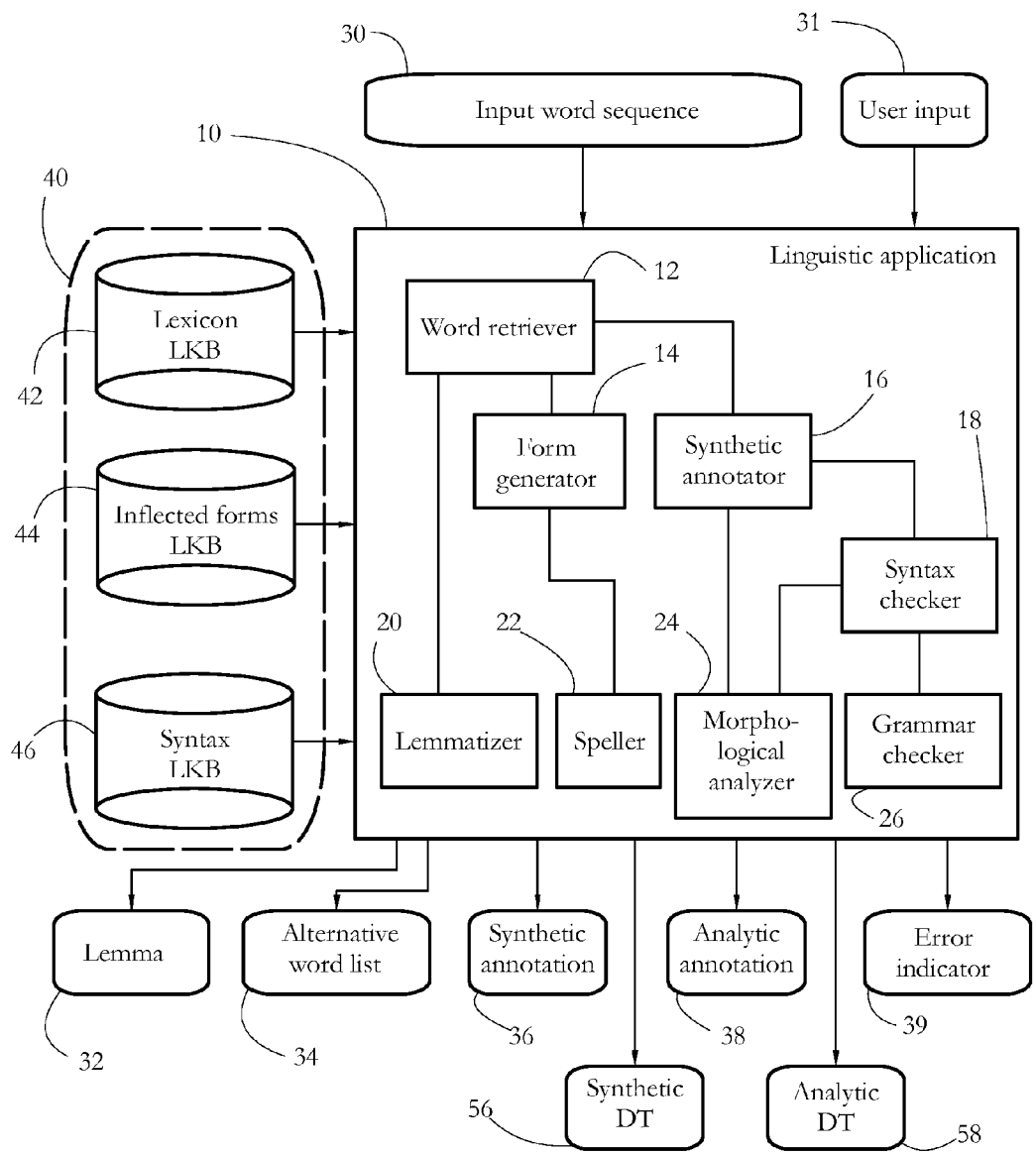
FIG. 1 shows an exemplary linguistic application comprising a word retriever, a form generator, a synthetic annotator, a grammar checker, a lemmatizer, a speller, a morphological analyzer, and a grammar checker, according to some embodiments of the present invention.

FIG. 1 shows a diagram of an exemplary linguistic application 10 according to some embodiments of the present invention. Application 10 may be a computer program running on a system including one or more general-purpose computers. Application 10 enables a user to perform a number of linguistic operations including, among others, a spelling check, a grammar check, and a linguistic annotation, on a sequence of words (e.g. piece of text) formulated in a natural language. Examples of natural languages include English, French, German, Japanese, and Romanian, among others. To perform the tasks listed above, linguistic application 10 exploits the information stored within a set of linguistic knowledgebases (LKBs) 40 comprising computer-readable encodings of several linguistic aspects of the respective natural language.

In some embodiments, application 10 includes a word retriever 12, a form generator 14 and a synthetic annotator 16, both connected to word retriever 12, a syntax checker 18 connected to synthetic annotator 16, a lemmatizer 20 connected to word retriever 12, a speller 22 connected to form generator 14, a morphological analyzer 24 connected to syntax checker 18, and a grammar checker 26 connected to syntax checker 18. Items 12-26 may be software applications (e.g. subroutines or modules). In some embodiments, modules 20-26 are software entities operating at a level higher than modules 12-18, in that the operation of each of modules 20-26 comprises software calls to one or several of modules 12-18. The operation of each item 12-26 is described in detail below.

In some embodiments, application 10 receives an input word sequence 30, a user input 31, and input from LKBs 40, and produces a set of outputs including a lemma 32, an alternative word list 34, a synthetic annotation 36, an analytic annotation 38, a synthetic dependency tree (DT) 56, an analytic DT 58, and an error indicator 39. The contents and format of items 32, 34, 36, 38, 39, 56, and 58 will be described in detail below.

In some embodiments, input word sequence 30 comprises a text representation of an arbitrary sequence of words, such as a fragment of text or a sentence written in a natural language. Sequence 30 may or may not have a meaning to a reader, and may or may not be grammatically well formed. In some embodiments, a word is a sequence of characters placed between consecutive blank spaces or other word delimiters. Words may include numbers, punctuation, and other alphanumeric or non-alphanumeric characters or symbols. A word may or may not be an actual dictionary word (e.g. it may comprise spelling errors). Here we will use the term valid word to indicate a sequence of characters which represents an actual, genuine word of the respective natural language. In some embodiments, input word sequence 30 may comprise an ordered list of words or some other computer-readable representation of a sequence of words, such as the output of a text segmentation software application. In some embodiments, input word sequence 30 may comprise a text representation of the contents of an audio signal (such as the output of a speech recognition software application), or a text representation of the contents of an image or video signal (such as the output of an optical character recognition application).

In some embodiments, linguistic knowledgebases 40 include a lexicon LKB 42, an inflected forms LKB 44, and a syntax LKB 46. In some embodiments, lexicon LKB 42 comprises an inventory of computer-readable lexicon entries including, among others, entries for words and multiword expressions. Word-type entries comprise lexical information corresponding to individual words of a natural language. In some embodiments, a word-type entry may comprise a lemma and a set of supplements and/or additional wordforms. In some embodiments, the lemma is the canonical, dictionary form of the word. For example, for nouns, the lemma may be the nominative singular form of the word, while for verbs it may be the infinitive form. The morphological form of the lemma may be chosen by convention, and may vary between languages. In some embodiments, the lemma of a single word entry may comprise multiple words. For example, in English, the infinitive of verbs is accompanied by the particle "to", e.g. to fly, to read. Therefore, the lemma of the single word entry "read" may be "to read". One of the words of a multiple word lemma may be chosen as center word ("read" in the previous example), and the others may be regarded as auxiliary ("to", in the same example). In some embodiments, a supplement is a word that accompanies the lemma and does not receive a separate lexicon entry. For example, in many dictionaries, the lemma of a noun (nominative-singular form) may be accompanied by a supplement nominative-plural form of the noun. The lemma of an adjective is usually chosen to be the nominative-masculine-singular form, in which case it may be accompanied by the supplements nominative-masculine-plural, nominative-feminine-singular, and nominative-feminine-plural forms of the same adjective.

A multiword expression (MWE) may be any meaningful sequence of words in a natural language, whose multiword quality does not stem from inflection alone. The sequence of words forming an MWE is used as a whole, the meaning of which may be distinct from that of its constituent words and/or from the literal meaning of the MWE. Examples of MWEs include composite words (e.g. high-risk, to finger-point, member of parliament, chief executive officer, expectation value), phrasal constructions such as propositional verbs (e.g. to put off, to stumble upon, to look after), and idiomatic phrases (e.g. turn of phrase, to hit the nail on the head, to pass the buck, to kick the bucket), among others. By contrast, multiword entities resulting from inflection (e.g., more refined, should have gone, etc.), or multiword lemmas (e.g. to read) are not considered MWEs.

In some embodiments, a lexicon entry may comprise a text representation of the entry in the respective language, and a set of additional data related to the entry. Examples of such data include: phonetic transcriptions, indicators of semantics (e.g. the meaning of the entry in various contexts, a set of synonyms, antonyms, paronyms, hyponyms, hypernyms, meronyms, holonyms, homonyms, heteronyms, homophones, diminutives, augmentatives, etc., of the respective entry), indicators of etymology (which may include text representations in the language of origin), indicators of time or period (e.g., for archaic word forms), and indicators of specific areas of use (e.g. seamanship, biotechnology, slang, etc.), among others.

In some embodiments, lexicon entries are stored in lexicon LKB 42 in the form of lexicon declarations formulated in a computer-readable language. Examples of lexicon declarations in Grammar Abstract Language (GAL) and Extensible Markup Language (XML) are given below.

In some embodiments, inflected forms LKB 44 comprises a set of inflected form entries. In many natural languages, the inflected form of a word may comprise either a single word (also termed a synthetic inflected form), or multiple words (also called an analytic inflected form). For example, in English, the common plural form of nouns is a synthetic form (the noun receives an -s suffix, while remaining a single word: cars, images, etc.). The comparative form of an adjective may be either a synthetic form (single word, e.g. faster), or an analytic form (multiword, e.g. more beautiful). In some embodiments, an inflected form entry may comprise, beside the respective inflected form, an indicator of the inflection situation of the respective word. Each inflection situation is a unique combination of instances of grammatical attributes of the respective language (exemplary inflection situations are {class:noun/case:accusative/gender:feminine/number:singular} and {class:verb/transitivity:transitive/tense:present/mood:indicative/person:first/number:singular}). In some embodiments, inflection situations are described using attribute-value trees (AVT, see below).

In some embodiments, entries for synthetic and analytic inflected forms are stored in inflected form LKB 44 in the form of inflected form declarations (computer-readable encodings in GAL or XML). An example of inflected form declaration is presented in detail below.

In some embodiments, syntax LKB 46 comprises a set of computer-readable syntax rule declarations encoding the syntax of the respective language (an example will follow).

Some embodiments of LKBs 40 may store linguistic data in a computer-readable form such as XML. For XML-format data, a document type definition (DTD) is provided for each data type (LKB). In some embodiments, one or several of LKBs 40 may reside on a server computer or on computer readable media, in part or entirely, and may be made available to linguistic application 10 over a computer network, as shown below.

Figure 2:
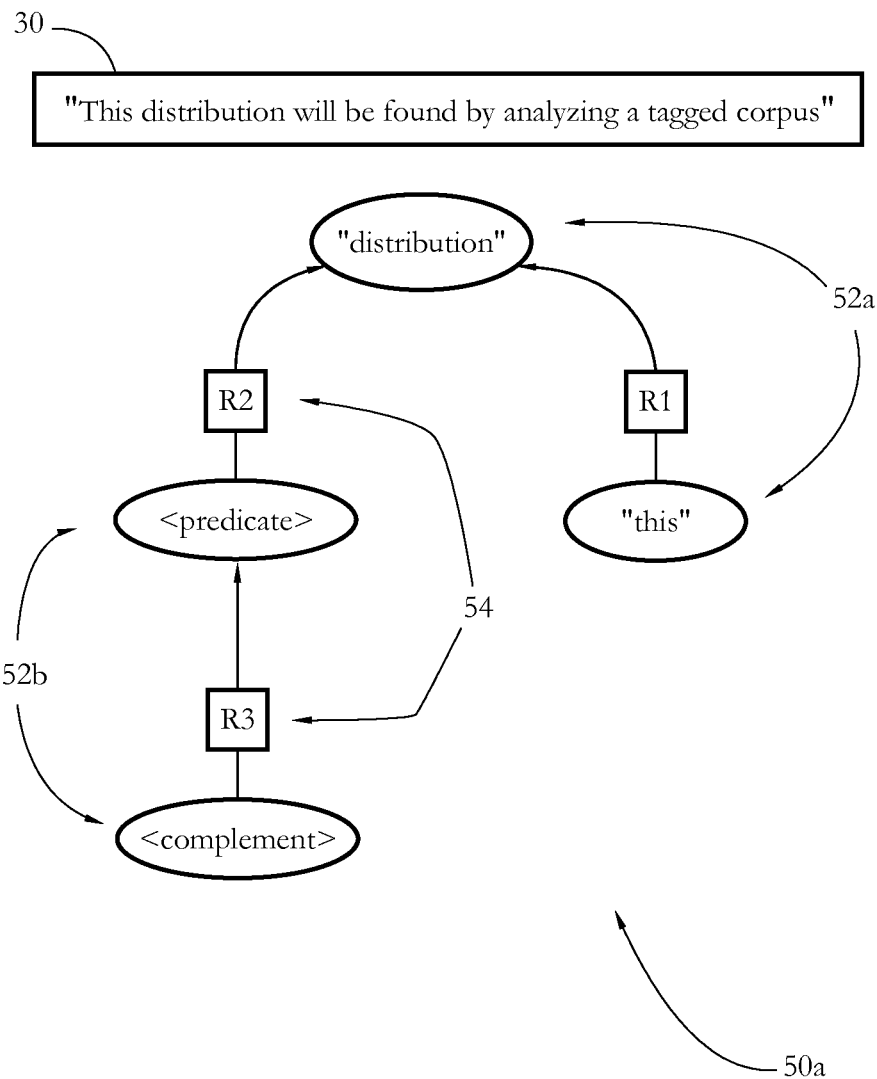
FIG. 2 shows an exemplary linguistic dependency tree corresponding to a word sequence in the English language, according to some embodiments of the present invention.

In some embodiments, lexicon declarations of multiword entries (e.g. MWEs) and/or inflected form declarations of analytic (multiword) inflected forms may comprise computer-readable encodings of linguistic dependency trees (DTs). FIG. 2 shows an exemplary graphical representation of a dependency tree 50a associated with input word sequence 30. Dependency tree 50a is a hierarchical, branched structure comprising a plurality of linguistic nodes 52a-b connected by linguistic links 54. Trees such as DT 50a may be produced by various levels of a syntactic analysis of word sequence 30.

In some embodiments, dependency trees may include terminal nodes, non-terminal nodes, pseudoterminal nodes and/or procedural nodes. Terminal nodes are nodes that can not be further substituted with other nodes or dependency trees. An example of a terminal node is a word (e.g. nodes 52a in FIG. 2). In some embodiments, terminal nodes may be invariable, wholly-variable, or partially-variable. Invariable terminal nodes have a fixed form in different instances of a multiword expression. Wholly-variable terminal nodes can appear as different words in different instances of the same multiword expression. Partially-variable terminal nodes can appear with different inflexions in different instances of a multiword expression. A non-terminal node can be substituted with other nodes or dependency trees (e.g. nodes 52b in FIG. 2). Pseudoterminal nodes may represent categories of words sharing a given grammatical function (e.g. nouns). Procedural nodes are computer routines executed in relation to the respective node. An illustrative procedural node is a piece of code that turns numerals (e.g. "twenty-one") into their numeric values (e.g. 21). Other procedural nodes may, for example, manipulate pictures or sounds embedded in a piece of text.

In general, a linguistic node such as the nodes 52a-b shown in FIG. 2 may represent a part (e.g. a word or sub-expression) of a word sequence, while a linguistic link such as the linguistic links 54 shown in FIG. 2 may represent a grammatical relationship between a pair of linguistic nodes. The type of grammatical relationship represented by links 54 may depend on the respective natural language. In some embodiments, general types of grammatical relationships may comprise coordination and subordination. Some links 54 may represent more particular types of grammatical relationship. For example, in FIG. 2, the linguistic link labeled R2 may represent the relation between a subject and a predicate.

Figure 3:
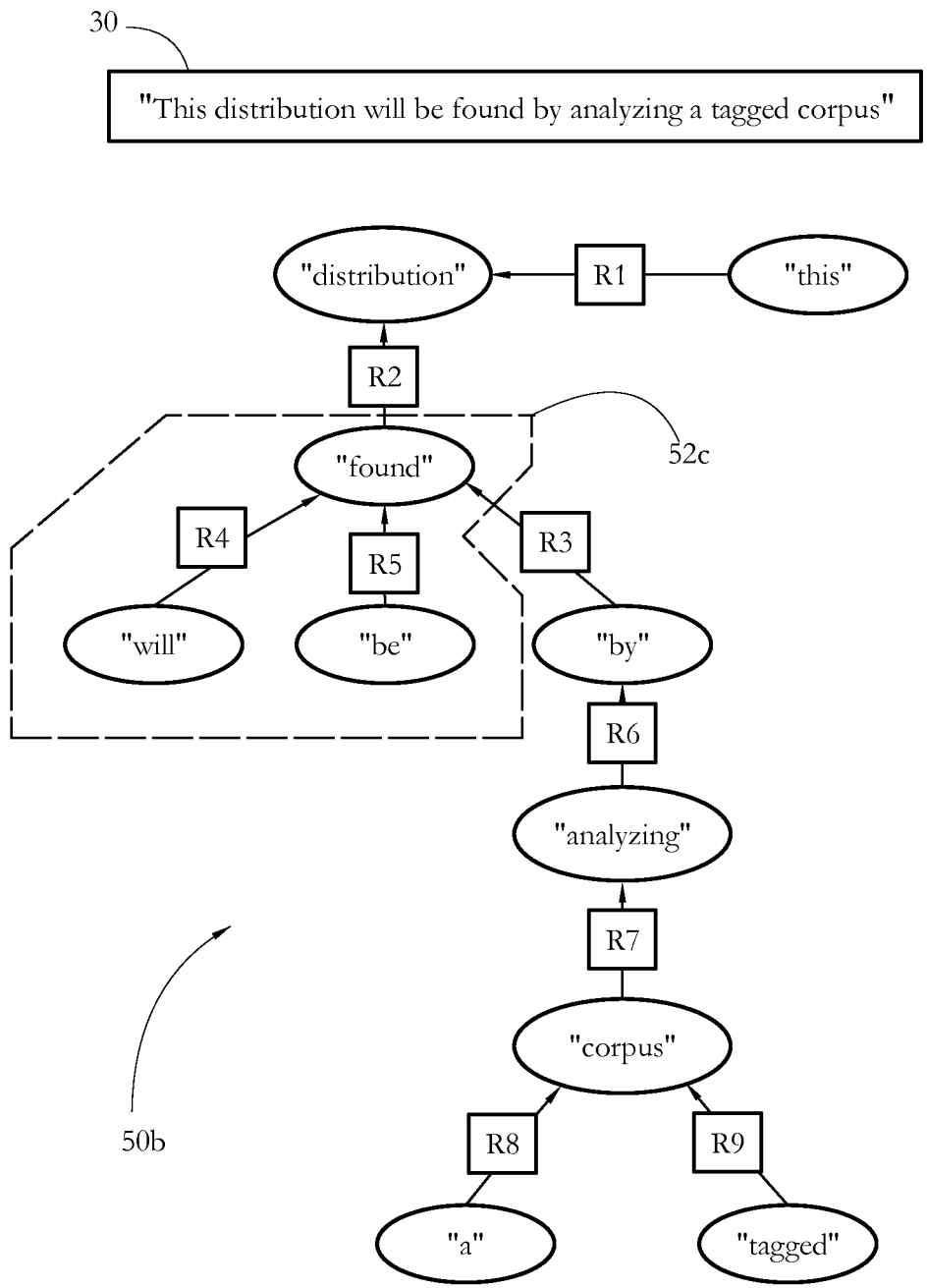
FIG. 3 shows an exemplary synthetic dependency tree of the word sequence of FIG. 2 according to some embodiments of the present invention.
Figure 4:
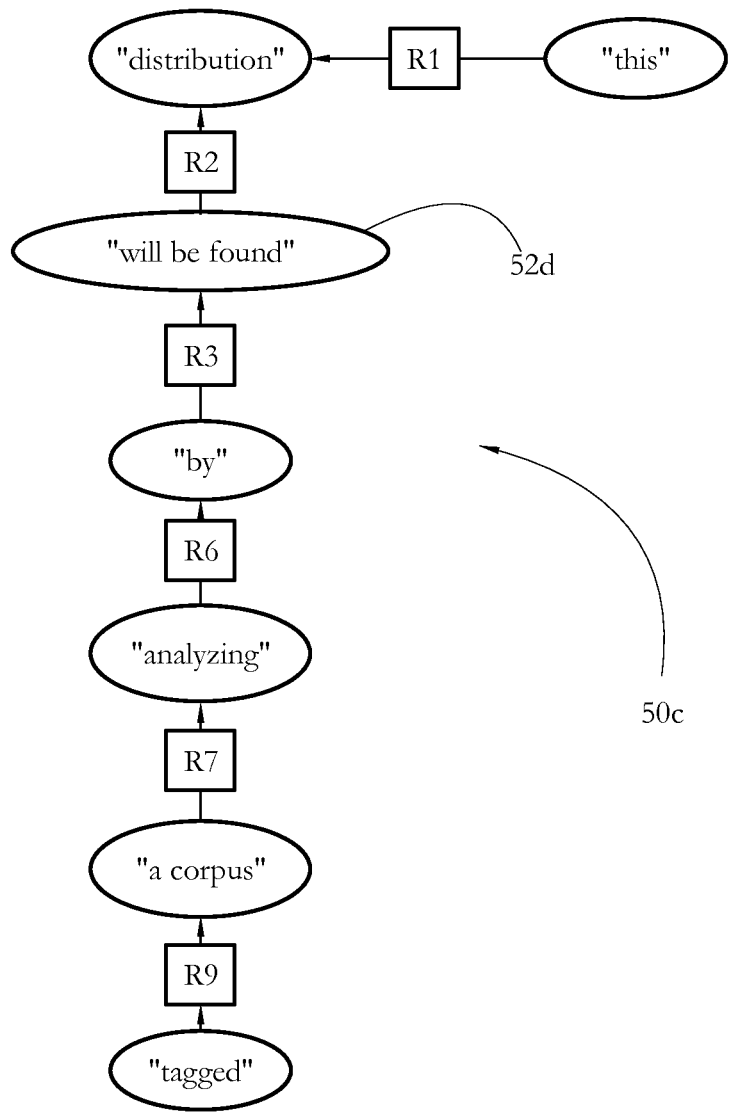
FIG. 4 shows an exemplary analytic dependency tree of the word sequence of FIG. 2 according to some embodiments of the present invention.

In some embodiments, dependency trees include synthetic and analytic dependency trees. FIG. 3 shows a synthetic dependency tree 50b of the word sequence illustrated in FIG. 2, according to some embodiments of the present invention. Synthetic DT 50b consists exclusively of terminal nodes comprising individual words of the natural language. In contrast, FIG. 4 shows an analytic dependency tree 50c of word sequence 30. Analytic DT 50c consists of terminal nodes, wherein each analytic (multiword) inflected form of sequence 30 is represented by a single multiword terminal node. For example, in FIG. 4, a multiword node 52d has replaced a plurality of nodes 52c in FIG. 3 representing an analytic inflection form.

Figure 5:
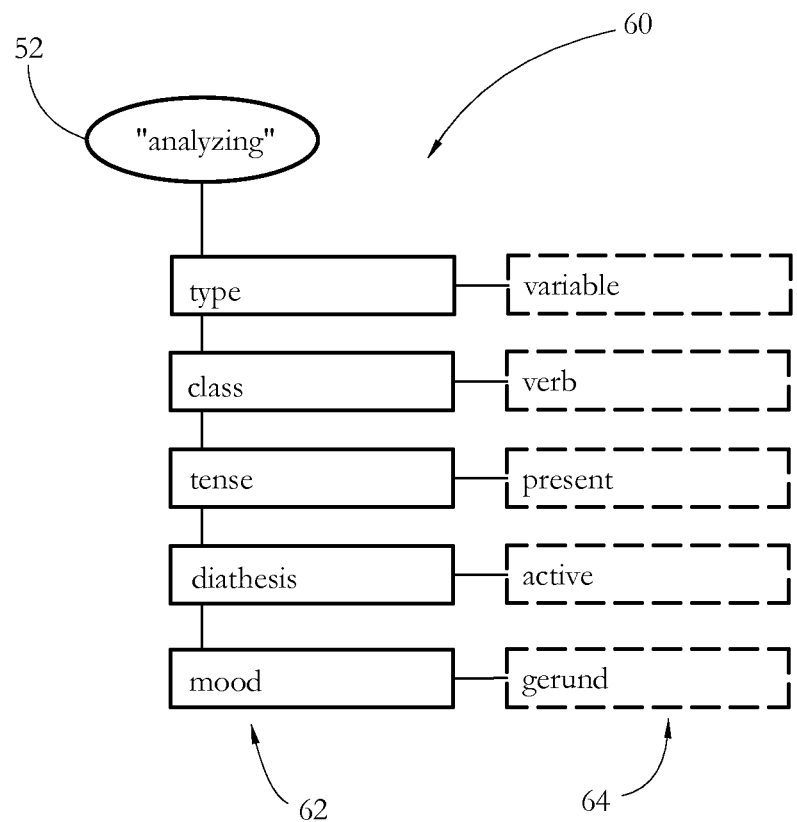
FIG. 5 illustrates an exemplary attribute-value tree associated to a node of the dependency tree of FIG. 3, according to some embodiments of the present invention.

In some embodiments, each linguistic node of a linguistic dependency tree may comprise an attribute-value tree (AVT). FIG. 5 shows an illustrative attribute-value tree 60 associated with a node 52 representing the word "analyzing" of word sequence 30. AVT 60 includes a set of attribute nodes 62 each having one or more value (instance) nodes 64 as children. Attribute nodes 62 may represent various linguistic features describing a given node 62 from the viewpoint of grammar. For example, each attribute node 62 may represent a syntactic or morphological category (such as case, number, and gender). Value nodes 64 represent actual instances or values of an attribute node 62 corresponding to a given linguistic node (such as genitive, plural, and masculine, respectively, in the previous example). In some embodiments, value nodes 64 themselves may have one or more attribute nodes as children.

Figure 6:
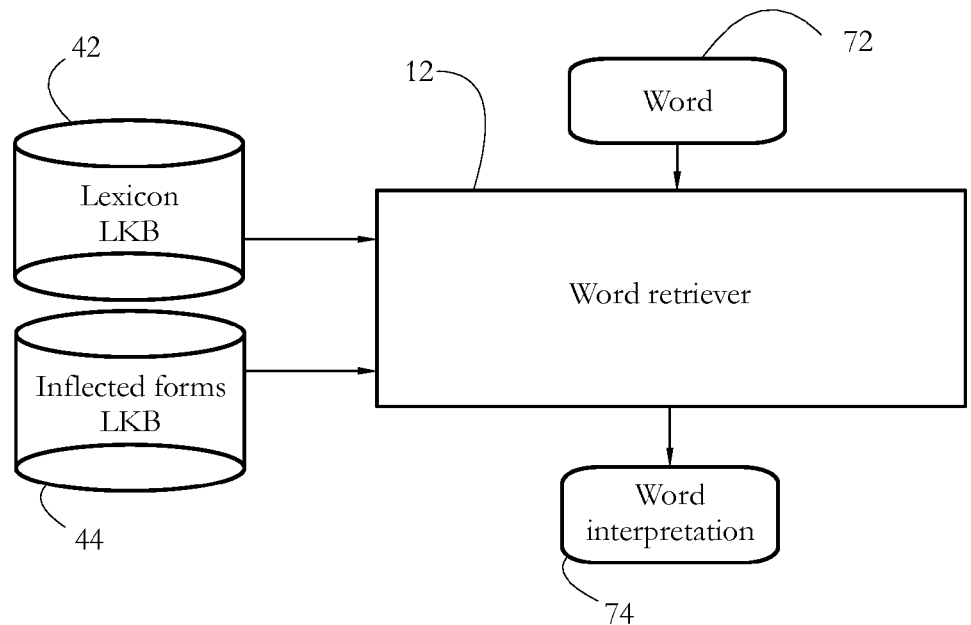
FIG. 6 shows a diagram of an exemplary word retriever forming part of the linguistic application of FIG. 1, according to some embodiments of the present invention.

FIG. 6 shows a diagram of word retriever 12 (FIG. 1) according to some embodiments of the present invention. Word retriever 12 receives a word 72 and data from lexicon LKB 42 and inflected form LKB 44, and outputs a word interpretation 74 of word 72.

In some embodiments, word 72 is a sequence of characters, which may or may not be an actual word of the respective natural language (e.g. it may comprise spelling errors). In some embodiments, word 72 may include numbers and/or other non-alphanumeric symbols.

Word interpretation 74 comprises a lemma of word 72 and an inflection indicator of word 72, including a computer-readable encoding of a set of inflection situations of word 72. In some embodiments, each inflection situation is encoded as an attribute-value tree. Occasionally, a word may represent several homonymic inflected forms. For example, some of the possible inflection situations of the English word "spell" are {class:verb/transitivity:transitive/mood:indicative/tense:present/person:first/number:singular} (as in "I spell"), {class:verb/transitivity:transitive/mood:indicative/tense:present/person:second/number:singular} (as in "you spell"), {class:verb/transitivity:transitive/mood:imperative/tense:present/person:second/number:singular}(as in "spell that for me"), and {class:noun/case:accusative/article:indefinite/number:singular}(as in "I cast a spell"), among others. In such a case, word interpretation 74 may include an encoding of each of the respective inflection situations and lemmas, e.g. in the form of an ordered list.

In some embodiments, when LKBs 42 and/or 44 do not contain an entry for word 72, word interpretation 74 may comprise a failed interpretation indicator (e.g., interpretation 74 may have a NULL value). Such a failed interpretation may occur when word 72 is not a valid word of the respective language (e.g. word 72 is misspelled).

Figure 7:
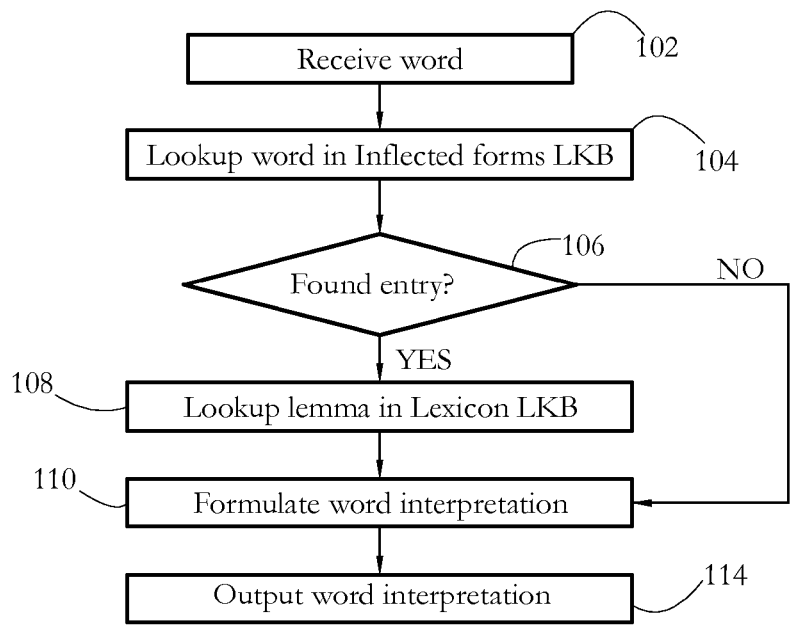
FIG. 7 shows an exemplary sequence of steps performed by the word retriever of FIG. 6 according to some embodiments of the present invention.

FIG. 7 shows an exemplary sequence of steps performed by word retriever 12 according to some embodiments of the present invention. In a step 102, word retriever receives word 72 from a user or from another application (see below). In a step 104, word retriever 12 performs a lookup of word 72 in inflected forms LKB 44, by e.g. formulating a query, transmitting the query to LKB 44, receiving, and interpreting the result of the query. If at least one entry for word 72 exists in inflected forms LKB 44, step 104 returns a nonempty inflection indicator of word 72. Next, a step 106 determines whether an entry for word 72 was found. If yes, word retriever 12 proceeds to a step 108; if no, to a step 110.

In step 108, word retriever 12 performs a lookup of the lemma of word 72 in lexicon LKB 42, according to the inflection indicator(s) received in step 104. The lookup may comprise formulating a query, transmitting the query to LKB 42, receiving, and interpreting the result of the query. In step 110, word retriever 12 formulates word interpretation 74 for output, e.g. by concatenating data received from LKBs 42, 44, and/or by compiling data received from LKB's 42, 44 into a different data format. If step 104 resulted in a failed interpretation (word 72 was not found, e.g., in case of misspelling), word retriever 12 may set word interpretation 74 to NULL or to another predefined value to indicate the failure to interpret word 72. A step 114 outputs word interpretation 74 to a user or to another application (see below).

Figure 8:
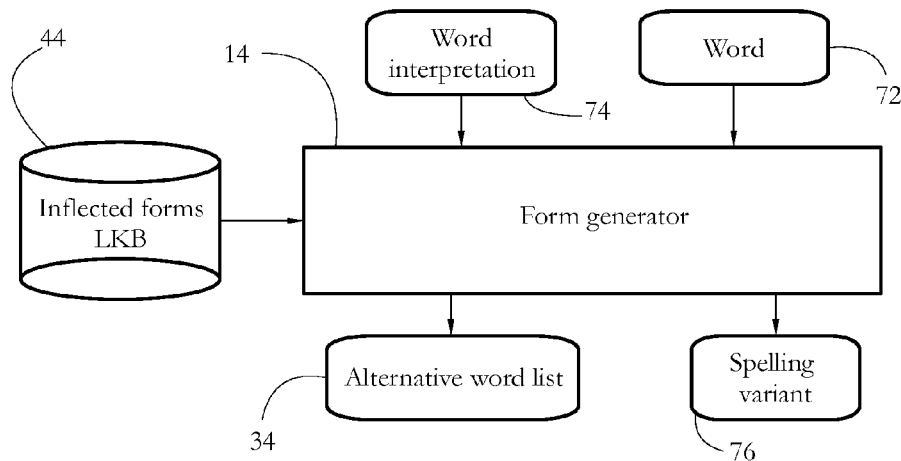
FIG. 8 shows a diagram of an exemplary form generator according to some embodiments of the present invention.

FIG. 8 shows a diagram of form generator 14 (FIG. 1) according to some embodiments of the present invention. Form generator receives word 72 from a user or from another application (see below), and word interpretation 74 from word retriever 12, and outputs a spelling variant 76 to word retriever 12 and an alternative word list 34 to a user or to another application. In some embodiments, alternative word list 34 comprises a set of valid words of the respective natural language having a predetermined spelling similarity to word 72.

In some embodiments, spelling variant 76 of word 72 is a sequence of characters (not necessarily a valid word) having a predetermined spelling similarity to word 72. In some embodiments, the spelling similarity between a first and a second word is a number (e.g. a positive integer) determined according to the number of spelling transformations needed to change the first word into the second word or vice versa. Spelling transformations include character deletion, character insertion, character replacement, and neighboring character swap, among others. For example, the words "Califronia", "California", "Calirfornia" are all spelling variants of the word "California", with a spelling similarity of 1 (one spelling transformation is needed to transform one word into another). In some embodiments, a set of words has a predetermined spelling similarity (e.g. 3) to a target word when each member of the set has a spelling similarity to the target word not exceeding a predetermined threshold (in the current example, 3).

Figure 9:
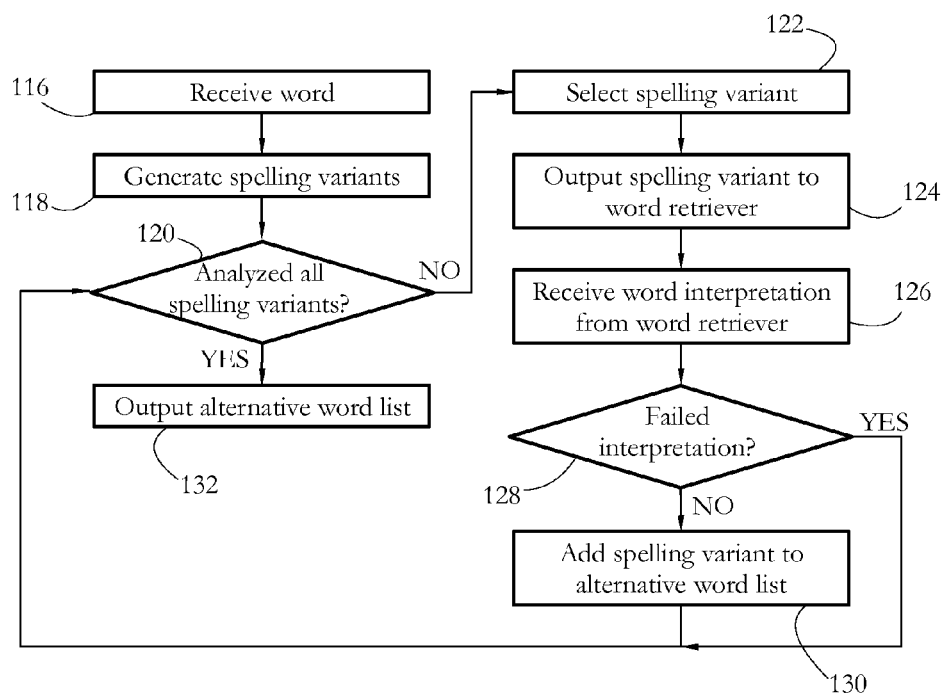
FIG. 9 shows an exemplary sequence of steps performed by the form generator of FIG. 8 according to some embodiments of the present invention.

FIG. 9 shows an exemplary sequence of steps performed by form generator 14 according to some embodiments of the present invention. In a step 116, form generator receives word 72 (e.g. from speller 22, see below). In a step 118, form generator generates a set of spelling variants having a predetermined spelling similarity to word 72.

To produce spelling variants, form generator 14 may apply a set of spelling transformations (e.g. character replacement, character insertion, etc.) to word 72. In some embodiments, the number of such transformations may not exceed a predetermined threshold (e.g., 2). In some embodiments, the number of spelling variants thus generated is reduced by eliminating spelling variants comprising certain disallowed character sequences. For example, since no valid word of the English language contains the character sequences "cx" or "bmn", any spelling variant containing such sequences may be removed. To filter out spelling variants comprising disallowed character sequences, some embodiments of form generator 14 may employ character neighborhood tables. Such neighborhood tables may be implemented e.g., via two- or three-dimensional tables of bits indicating disallowed two- or three-character sequences, respectively. In some embodiments, character neighborhood tables may be generated automatically by analyzing a corpus of valid words of the respective language (e.g., inflected forms LKB 44).

Next, form generator 14 performs a sequence of steps 120-130 for each spelling variant 76 of word 72 computed within step 118. In a step 120, form generator 14 determines whether a termination criterion is fulfilled (e.g. whether all spelling variants have been analyzed), and if yes, proceeds to a step 132. If no, a step 122 selects spelling variant 76 from the set computed in step 118. A step 124 outputs spelling variant 76 to word retriever 12. A step 126 receives word interpretation 74 of spelling variant 76 from word retriever 12. A step 128 determines whether word retriever 12 has failed to produce an interpretation of spelling variant 76, according to word interpretation 74. If yes (i.e., spelling variant 76 is not a valid word, or no entry could be found for spelling variant 76 in LKB 44), form generator 14 returns to step 120 (see above).

If no (i.e. spelling variant 76 is a valid word), a step 130 adds spelling variant 76 to alternative word list 34. When sequence 120-130 has been performed for all spelling variants computed in step 118, alternative word list 34 comprises the subset of spelling variants 76 which are valid words. In a step 132, form generator outputs alternative word list 34 and quits.

Figure 10:
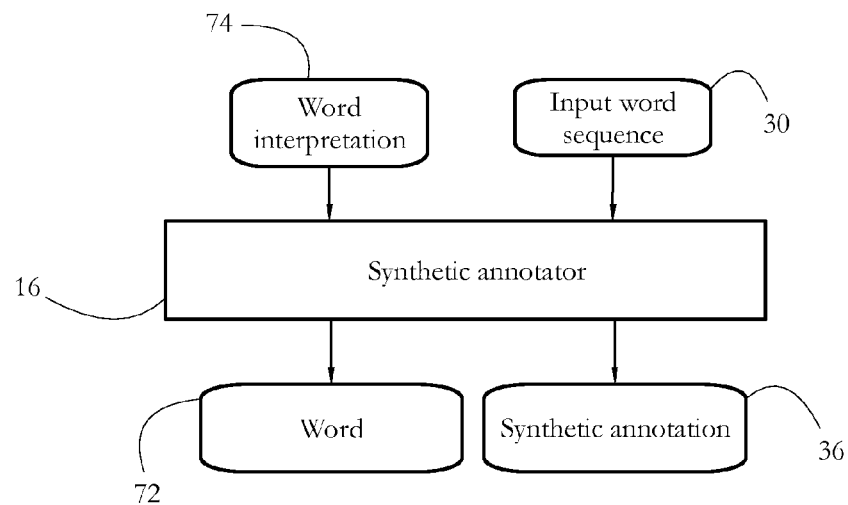
FIG. 10 shows an exemplary synthetic annotator according to some embodiments of the present invention.

FIG. 10 shows an exemplary diagram of synthetic annotator 16 (FIG. 1) according to some embodiments of the present invention. Synthetic annotator 16 receives input word sequence 30 from the user or from another application, and word interpretation 74 from word retriever 12, and outputs word 72 to word retriever 12 and a synthetic annotation 36 to a user or to a requesting application (e.g. syntax checker 18, see below). In some embodiments, synthetic annotation 36 comprises a set of word interpretations of each word in sequence 30.

Figure 11:
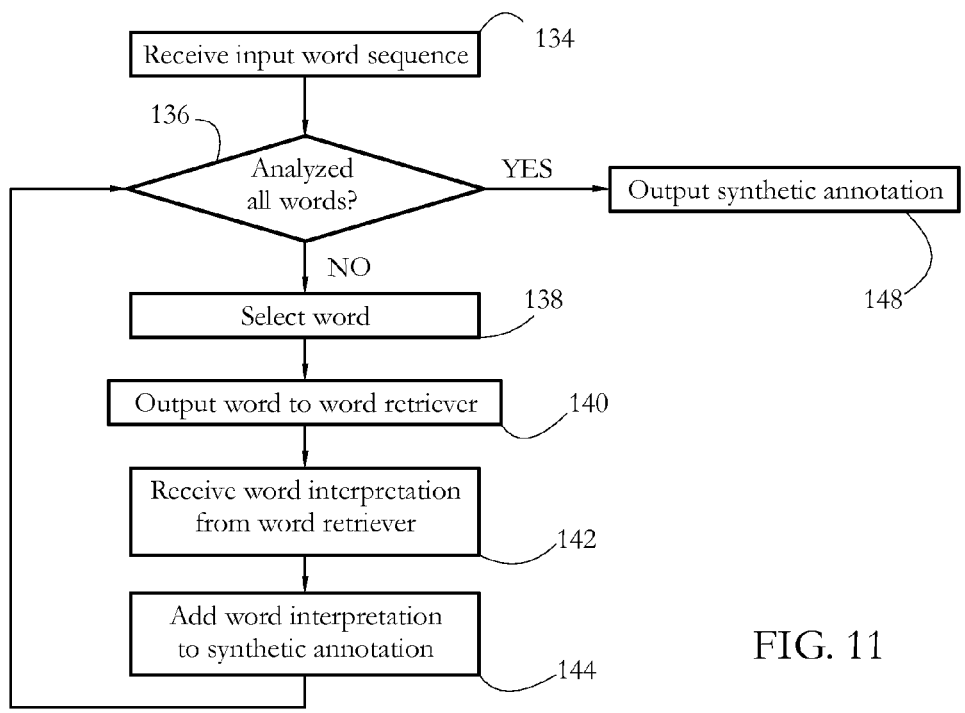
FIG. 11 shows an exemplary sequence of steps performed by the synthetic annotator of FIG. 10 according to some embodiments of the present invention.

FIG. 11 shows an exemplary sequence of steps performed by synthetic annotator 16 according to some embodiments of the present invention. A step 134 receives input word sequence 30. Next, a sequence of steps 136-144 is performed for each word in sequence 30. A step 136 determines whether a termination criterion is fulfilled (e.g. whether all words of sequence 30 have been analyzed), and if yes, annotator 16 proceeds to a step 148. If no, a step 138 selects word 72 from word sequence 30. A step 140 forwards word 72 to word retriever 12. A step 142 receives word interpretation 74 of word 72. A step 144 adds word interpretation 74 to synthetic annotation 36. When interpretation 74 indicates that word 72 is not valid (e.g. word 72 is misspelled), annotation 36 may comprise a failed interpretation indicator/tag associated to the respective word. In a step 148, synthetic annotator 16 outputs synthetic annotation 36 and quits.

Figure 12:
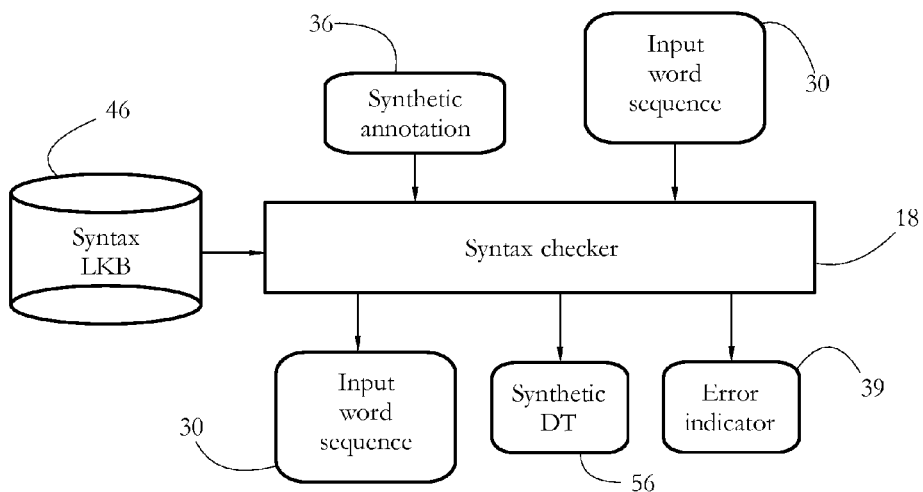
FIG. 12 shows a diagram of an exemplary syntax checker according to some embodiments of the present invention.

FIG. 12 shows an exemplary diagram of syntax checker 18 (FIG. 1) according to some embodiments of the present invention. Syntax checker 18 receives input word sequence 30 from a user or another application (e.g. morphological analyzer 24, see below), data from syntax LKB 46, and synthetic annotation 36 from synthetic annotator 16, and outputs sequence 30 to annotator 16, and synthetic dependency tree 56 of sequence 30 and error indicator 39 to a user or to a requesting application. In some embodiments, item 56 comprises a computer-readable encoding of the synthetic dependency tree of sequence 30, formulated in Grammar Abstract Language (GAL, see below) or extensible markup language (XML).

Figure 13:
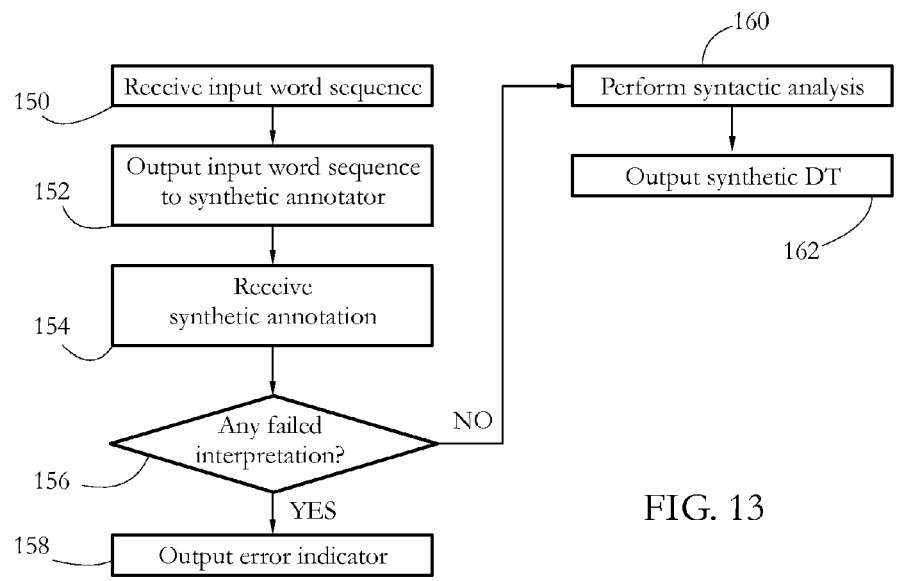
FIG. 13 shows an exemplary sequence of steps performed by the syntax checker of FIG. 12 according to some embodiments of the present invention.

FIG. 13 shows an exemplary sequence of steps taken by syntax checker 18 according to some embodiments of the present invention. In a step 150, syntax checker 18 receives input word sequence 30. In a step 152, sequence 30 is forwarded to synthetic annotator 16. A step 154 receives synthetic annotation 36 of input word sequence 30 from annotator 16. A step 156 determines whether annotation 36 comprises any indicators of failed interpretation (i.e. whether any word of sequence 30 was not recognized as a valid word). If yes, syntax checker 18 proceeds to a step 158.

If no (i.e., all words of sequence 30 are valid words), in a step 160 syntax checker 18 performs a syntactic analysis of input word sequence 30 according to data received from syntax LKB 46, to produce synthetic dependency tree (DT) 56 of word sequence 30. In some embodiments, step 160 includes performing a lookup of a syntax rule declaration stored in LKB 46, the declaration encoding a syntax rule, and determining a set of nodes of DT 56 according to the syntax rule. In some embodiments, the syntax rule lookup process is repeated iteratively, which results in a progressive refinement of the dependency tree. In some embodiments, at various stages of the syntactic analysis, a dependency tree comprising nonterminal as well as terminal nodes may de computed.

As a result of determining synthetic DT 56, a step 162 outputs tree 56 to the requesting application. If completion of step 156 resulted in any failed interpretation, in step 158 syntax checker 18 formulates and outputs error indicator 39. In some embodiments, error indicator 39 includes a set of words of sequence 30, which failed to interpret (e.g. misspelled words and/or valid words missing from LKB 44).

Figure 14:
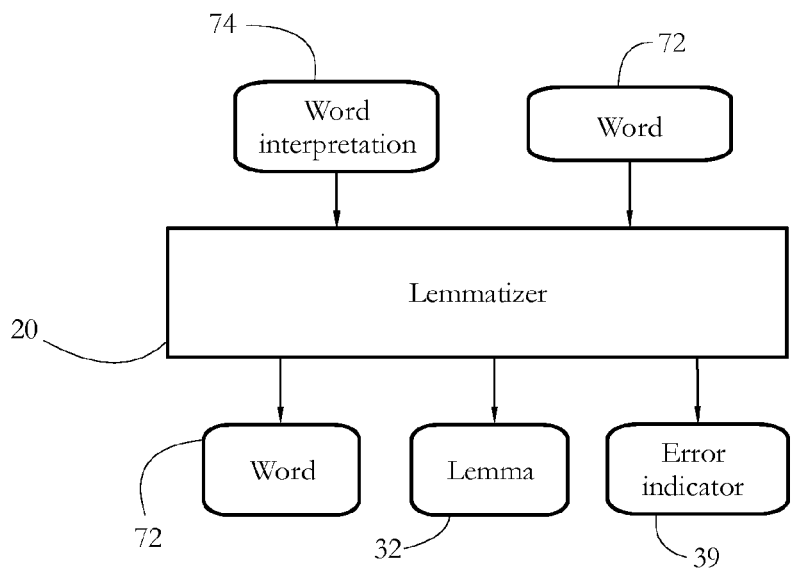
FIG. 14 shows an exemplary lemmatizer forming part of the linguistic application of FIG. 1 according to some embodiments of the present invention.

FIG. 14 shows an exemplary diagram of lemmatizer 20 (FIG. 1) according to some embodiments of the present invention. Lemmatizer 20 receives word 72 (e.g. from a user) and word interpretation 74 from word retriever 12, and outputs word 72 to word retriever 12, a lemma 32, and error indicator 39. In some embodiments, lemma 32 comprises a computer-readable encoding of the lemma of word 72, as returned by word retriever 12.

Figure 15:
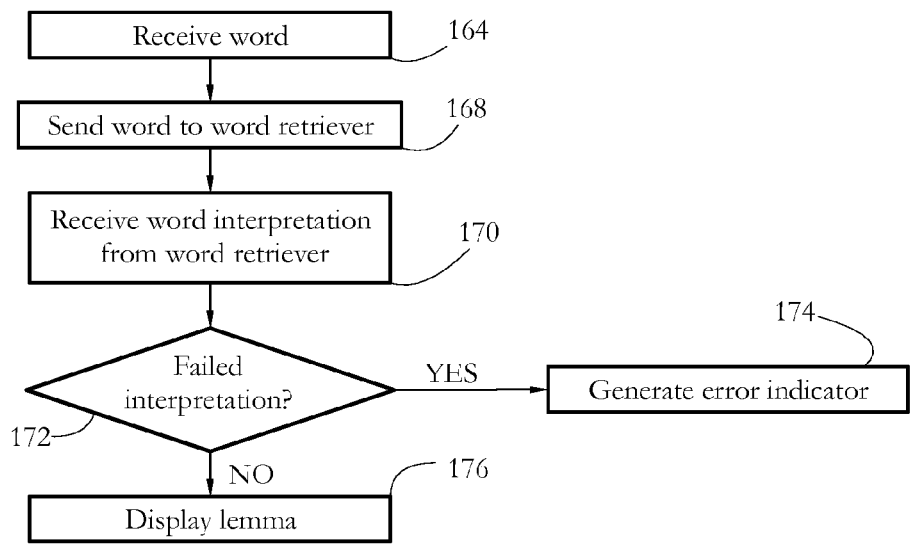
FIG. 15 presents an exemplary sequence of steps performed by the lemmatizer of FIG. 14.

FIG. 15 shows an exemplary step sequence performed by lemmatizer 20. In a succession of steps 164-168, word 72 is received and transmitted to word retriever 12, respectively. In a step 170, lemmatizer 20 receives word interpretation 74 of word 72 from word retriever 12. A step 172 determines whether step 170 resulted in a failed interpretation (e.g. word 72 is misspelled). If yes, a step 174 formulates and outputs error indicator 39 including a failed interpretation indicator. If no, a step 176 outputs lemma 32. In some embodiments, step 176 includes displaying lemma 32 and/or a representation of word interpretation 74 on a display device.

Figure 16:
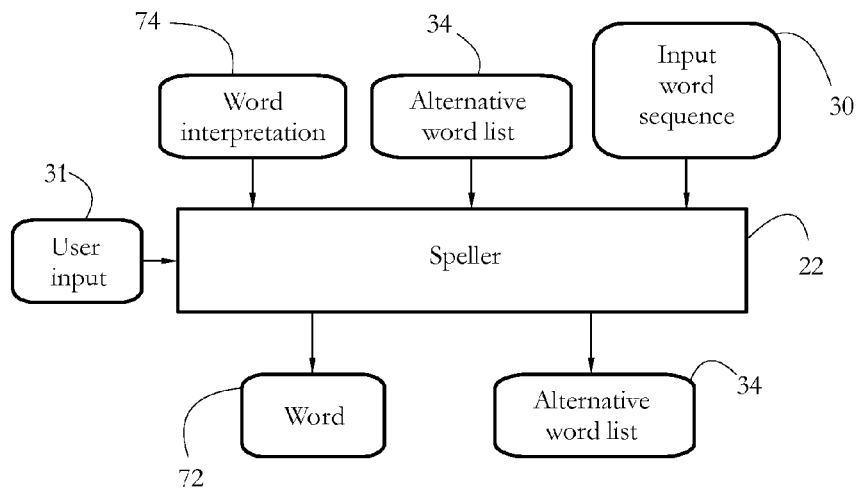
FIG. 16 shows a diagram of an exemplary speller application according to some embodiments of the present invention.

FIG. 16 shows an exemplary diagram of speller 22 (FIG. 1) according to some embodiments of the present invention. In some embodiments, speller 22 allows a user to verify the spelling of all words of a piece of text, and eventually replace any misspelled word with the respective valid word. Speller 22 receives input word sequence 30, word interpretation 74 from word retriever 12, alternative word list 34 from form generator 14, and user input 31, and outputs word 72 to word retriever 12, and list 34 to the user.

Figure 17:
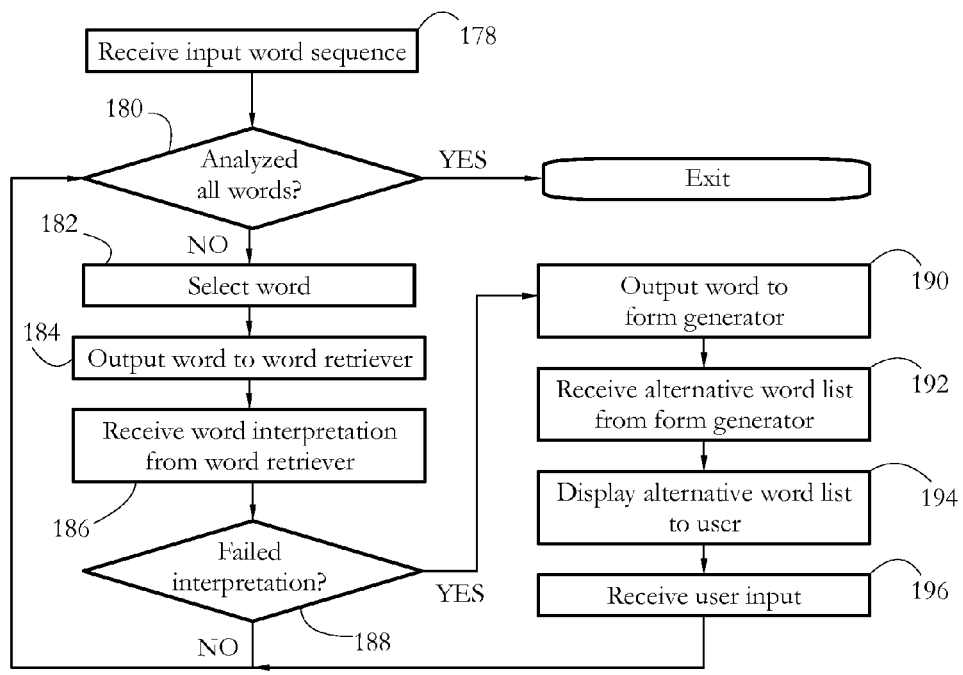
FIG. 17 shows an exemplary sequence of steps performed by the speller of FIG. 16 according to some embodiments of the present invention.

FIG. 17 shows an exemplary step sequence outlining the operation of speller 22 according to some embodiments of the present invention. In a step 178, speller 22 receives input word sequence 30 (e.g. from the user). Next, a sequence of steps 180-196 is performed successively for all words of input word sequence 30. A step 180 determines whether a termination criterion is fulfilled, e.g. whether all words of sequence 30 have been analyzed. If yes, speller 22 exits. If no, a succession of steps 182-184 selects word 72 from sequence 30 and transmits word 72 to word retriever 12. A step 186 receives word interpretation 74 of word 72 from word retriever 12. In a step 190, speller 22 determines whether interpretation 74 indicates a failed interpretation (e.g. that word 72 is misspelled). If no, speller 22 returns to step 180 (see above). If yes, in a succession of steps 190-192, speller 22 transmits word 72 to form generator 14, and receives alternative word list 34 corresponding to word 72 from form generator 14, respectively. In a step 194, speller 22 outputs list 34 to the user, by e.g. displaying list 34 on a display device. In some embodiments, in addition to list 34, speller 22 may also display a representation of sequence 30 in a manner that distinguishes word 72 from the rest of sequence 30 (e.g underlined, using a selected color, etc.), to indicate that word 72 is possibly misspelled. In a step 196, speller 22 receives user input 31. In some embodiments, user input 31 comprises an indicator of a selected word from list 34. In response to receiving user input 31, some embodiments of speller 22 may replace word 72 with the selected word and display to the user an updated representation of input word sequence 30 showing the replacement. Upon completion of step 196, speller 22 proceeds back to step 180.

Figure 18:
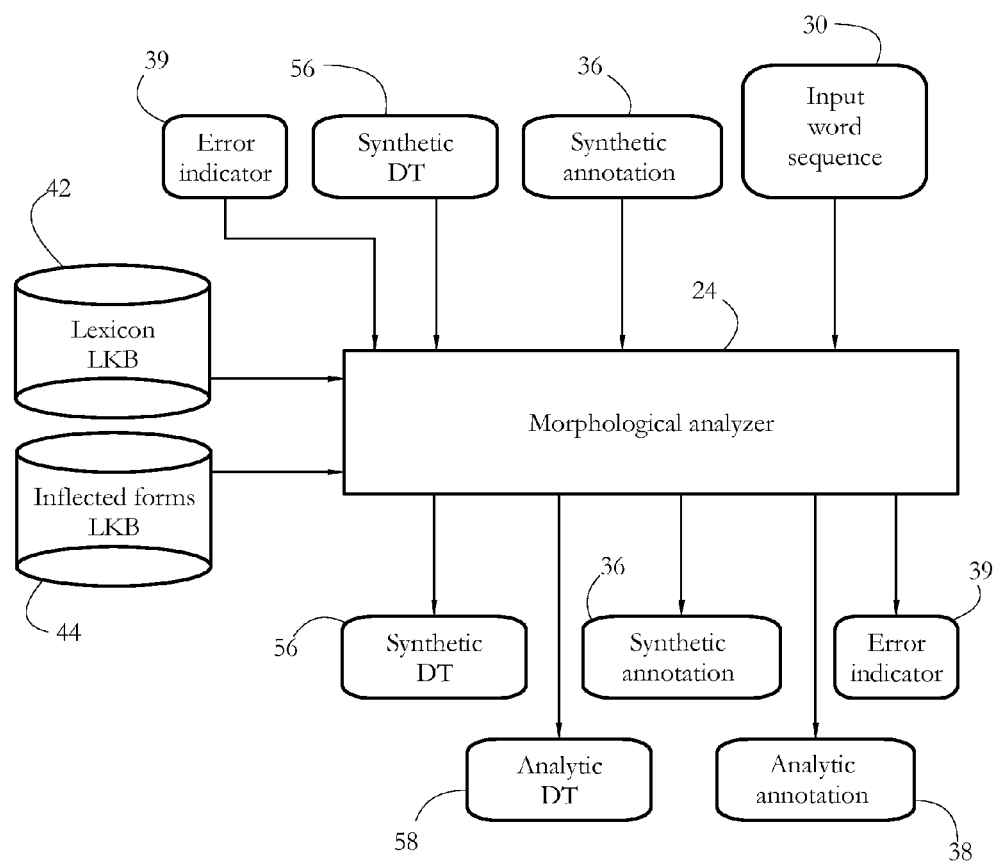
FIG. 18 shows an exemplary morphological analyzer forming part of the linguistic application of FIG. 1 according to some embodiments of the present invention.

FIG. 18 shows an exemplary diagram of morphological analyzer 24 according to some embodiments of the present invention. In some embodiments, analyzer 24 allows a user to perform an annotation/morphological analysis of a piece of text, to produce and display any one of a synthetic annotation, analytic annotation, and synthetic and analytic dependency trees corresponding to the text, as well as to identify any spelling and/or syntax errors present in the text. Analyzer 24 receives input word sequence 30 (e.g. from a user), synthetic annotation 36 of sequence 30 from synthetic annotator 16, and synthetic DT 56 of sequence 30 and/or error indicator 39 from syntax checker 18, and outputs synthetic annotation 36, analytic annotation 38, synthetic DT 56, and analytic DT 58 of sequence 30, and/or error indicator 39 to the user. In some embodiments, morphological analyzer also receives data from lexicon LKB 42 and inflection forms LKB 44B. In some embodiments, analytic DT 58 comprises a computer-readable encoding of the analytic dependency tree of sequence 30, formulated in Grammar Abstract Language (GAL, see below) or extensible markup language (XML). In some embodiments, analytic annotation 38 includes an interpretation of each analytic (multiword) inflection form in input word sequence 30. If word sequence 30 does not comprise any analytic inflection forms, analytic annotation 38 may be identical to synthetic annotation 36.

Figure 19:
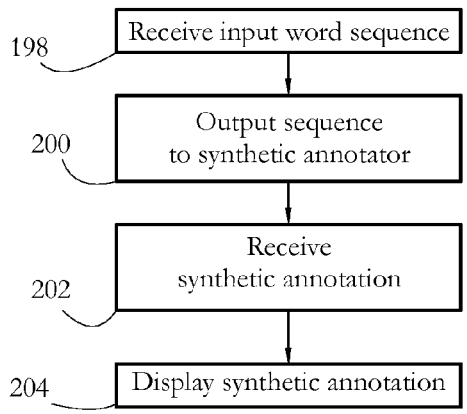
FIG. 19 shows an exemplary sequence of steps performed by the morphological analyzer of FIG. 18 to produce a synthetic annotation according to some embodiments of the present invention.

FIG. 19 shows an exemplary sequence of steps performed by morphological analyzer 24 in order to produce a synthetic annotation of input word sequence 30 according to some embodiments of the present invention. In a step 198, analyzer 24 receives sequence 30. In a step 200, sequence 30 is transmitted to synthetic annotator 16. A step 202 receives synthetic annotation 36 of sequence 30 from synthetic annotator 16. In a step 202, analyzer 24 outputs synthetic annotation 36 to the user by e.g. displaying sequence 30 and the word interpretation of each word of sequence 30 according to annotation 36. In some embodiments, step 202 includes displaying error indicators associated with words which failed to interpret.

Figure 20:
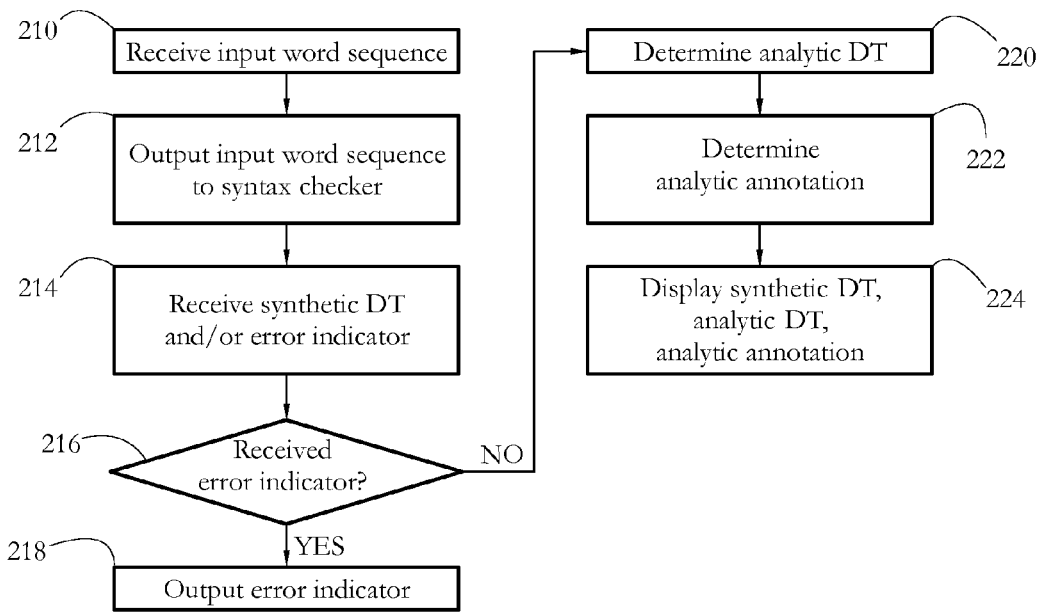
FIG. 20 shows an exemplary sequence of steps performed by the morphological analyzer of FIG. 18 to produce an analytic annotation according to some embodiments of the present invention.

FIG. 20 shows an exemplary step sequence performed by morphological analyzer 24 in order to produce an analytic annotation of input word sequence 30 according to some embodiments of the present invention. In a step sequence 210-212, sequence 30 is received and transmitted to syntax checker 18. In a step 214, analyzer 24 receives synthetic DT 56 or error indicator 39 from syntax checker 18. A step 216 determines whether syntax checker 18 returned an error indicator (e.g. whether input word sequence 30 has spelling errors). If yes, analyzer 24 outputs error indicator 39 and exits.

If no (i.e., when synthetic DT 56 is available), in a step 220, morphological analyzer 24 determines analytic DT 58 of sequence 30. Step 220 comprises identifying analytic (multiword) inflection forms within sequence 30, and for each analytic inflection form, replacing the set of terminal nodes of synthetic DT 56 corresponding to individual words of the respective analytic form with a non-terminal node representing the respective analytic form. In some embodiments, identifying analytic forms within sequence 30 comprises performing a lookup into inflection forms LKB 44 and/or lexicon LKB 42, where analytic forms are stored as a particular kind of entries.

Next, in a step 222, analyzer 24 formulates analytic annotation 38 of input word sequence 30 according to analytic DT 58 and/or synthetic annotation 36. In some embodiments, the lookup in inflection forms LKB 44 returns an interpretation of each analytic inflection form, including a representation of the respective inflection situation, e.g. as an attribute-value tree. To determine analytic annotation 58, morphological analyzer modifies synthetic annotation 36 by removing the word interpretations of individual words of each analytic form, and by adding the interpretation(s) of the respective analytic form. Next, in a step 224, analyzer 24 outputs analytic annotation 38, synthetic DT 56, and analytic DT 58 of input word sequence 30 to the user by e.g. displaying items 38, 56, and 58 on a display device.

Figure 21:
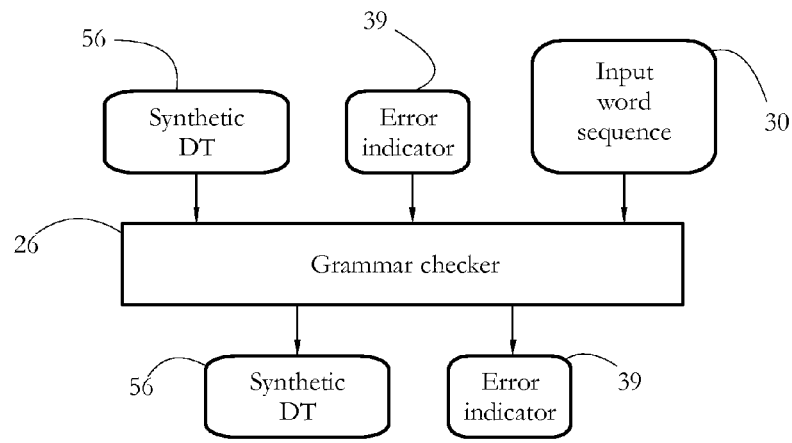
FIG. 21 illustrates an exemplary grammar checker forming part of the linguistic application of FIG. 1 according to some embodiments of the present invention.

FIG. 21 shows an exemplary diagram of grammar checker 26 (FIG. 1) according to some embodiments of the present invention. In some embodiments, grammar checker 26 allows a user to perform a syntactic analysis of a piece of text, to identify errors, and to display a representation of the synthetic dependency tree of the text. Grammar checker 26 receives input word sequence 30 (e.g. from the user), synthetic DT 56 of sequence 30 and/or error indicator 39 from syntax checker 18, and outputs synthetic DT 56 and/or error indicator 39.

Figure 22:
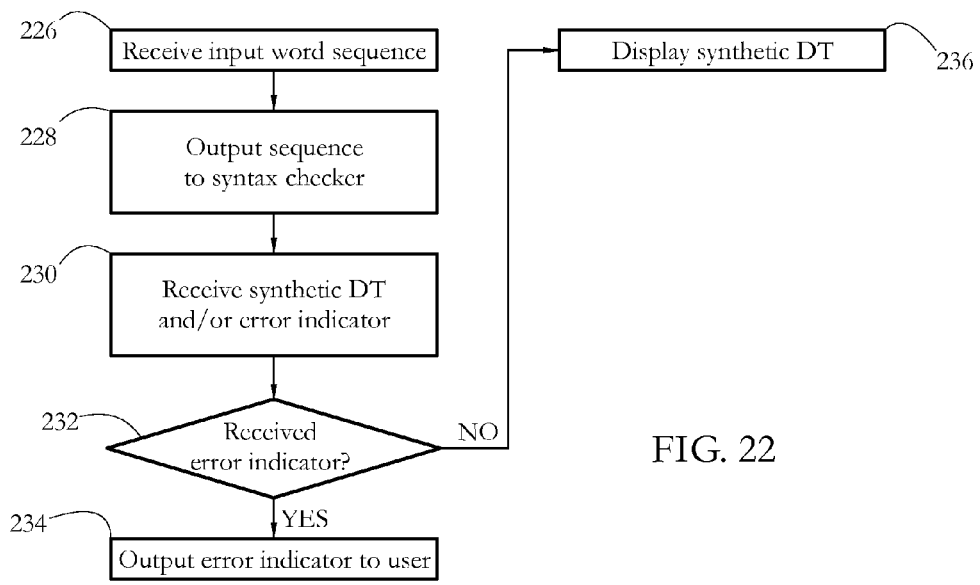
FIG. 22 shows an exemplary sequence of steps performed by the grammar checker of FIG. 21 according to some embodiments of the present invention.

FIG. 22 shows an exemplary step sequence performed by grammar checker 26 according to some embodiments of the present invention. In a step 226, grammar checker 26 receives input word sequence 30. In a succession of steps 228-230, sequence 30 is transmitted to syntax checker 18, and synthetic DT 56 or error indicator 39 is received from syntax checker 18, respectively. In a step 232, grammar checker determines whether error indicator 39 was received, and if yes, a step 234 outputs error indicator 39 to the user. If no, a step 236 outputs synthetic DT 56 to the user, by e.g. displaying a representation of DT 56 on a display device.

FIG. 23-A shows a computer-based LKB exploitation system 1000 according to some embodiments of the present invention. System 1000 includes a plurality of client computers 1020a-c connected through a network 1060. Network 1060 may be a wide-area network such as the Internet. Parts of network 1060 may also include a local area network (LAN). Client computers 1020a-c include corresponding LKBs 40a-c and linguistic applications 10a-c configured to interact with LKBs 40a-c to perform, among others, spell check, grammar check, and linguistic annotation as described in detail above.

FIG. 12-B shows a LKB exploitation system 1100 according to some embodiments of the present invention. System 1100 includes a server 1150 connected to a plurality of client computers 1120a-c through a network 1160. In this embodiment, a linguistic knowledge base 1140 is stored on server 1150 and is managed by a server-side linguistic application 1130. System 1100 allows client computers 1120a-c to remotely access LKB 1140 through client-side linguistic applications 1110a-c, respectively. In some embodiments, each client-side linguistic application 1110a-c may include a client/server communication interface and/or an internet-based program such as a browser interface.

Figure 24:
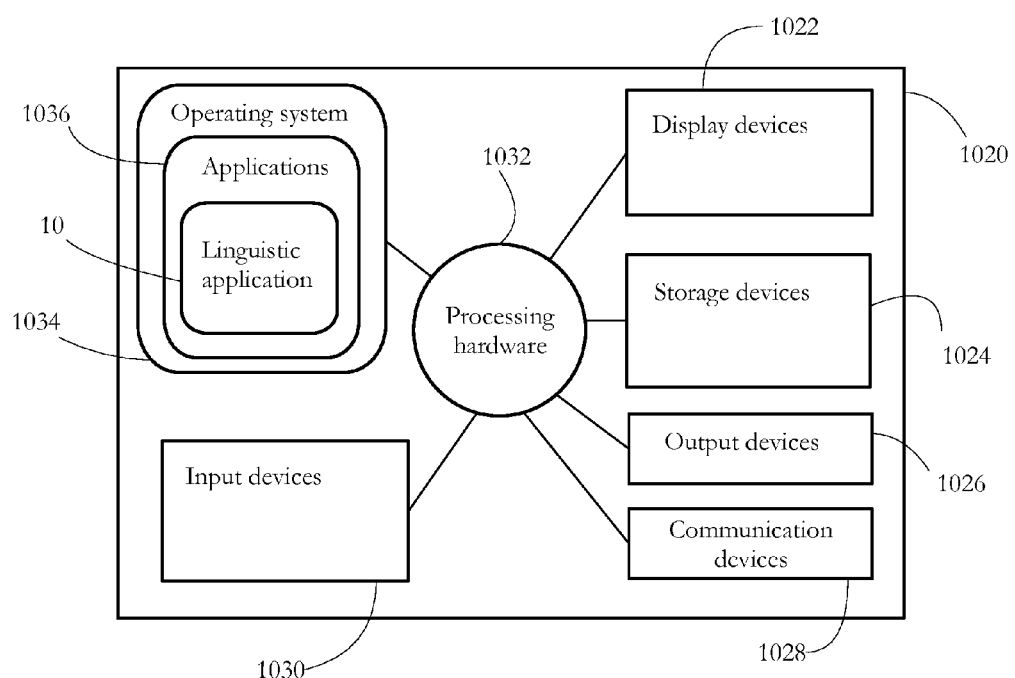
FIG. 24 shows a high-level diagram of a client computer having a linguistic application, according to some embodiments of the present invention.

FIG. 24 shows a high-level diagram of a client computer 1020 hosting linguistic application 10. Client computer 1020 includes storage devices 1024, input devices 1030, display devices 1022, output devices 1026, and communication devices 1028, all connected to processing hardware 1032. The operation of hardware 1032 is controlled by an operating system 1034. Storage devices 1024 include computer-readable media used for information storage and retrieval. Such computer-readable media may encode instructions to perform methods steps as described herein, as well as data structures described herein. Input devices 1030 may include computer keyboards, mice, microphones, and graphics tablets, among others. Display devices 1022 may include monitors and multimedia projectors. Output devices 1026 may include printers. Communication devices 1028 may include network adapters. A plurality of software applications 1036 may run under operating system 1034, including linguistic application 10.

In some embodiments, LKB data may be organized according to a Generative Dependency Grammar (GDG). For further information on GDG see for example the article by S. Diaconescu, "*Natural Language Syntax Description using Generative Dependency Grammar*", POLIBITS, Number 38, July-December 2008, ISSN:1870-9044. A GDG provides a set of rules for generating a dependency tree (DT) for a word sequence. In exemplary embodiments, each rule relates a left side (left member) to a right side (right member), wherein the left side of each rule contains a non-terminal DT node, and the right side of each rule has two parts: a node sequence, and a DT describing the interrelations of the nodes of the sequence. A terminal DT node, for example a word in a language, is present in that language's lexicon and may appear in the right side of one or more GDG rules. A non-terminal DT node appears at least once in the left side of a GDG rule and may appear in the right side of one or more GDG rules. A rule having a non-terminal node on its left side describes that node, while a rule having a non-terminal node on its right side refers to that node. A pseudoterminal node may appear on the right side of one or more GDG rules, but does not appear on the left side of a GDG rule. A generative process based on a GDG may be applied to some new text to confirm that the text is grammatically correct (accepted by the GDG) and to generate a DT for the new text.

In some embodiments, linguistic data including dependency tree and associated attribute-value trees may be encoded in a formal language denoted below as a Grammar Abstract Language (GAL). A GAL is a high-level language dedicated to linguistic processing, which provides an interface allowing human users to transfer linguistic knowledge to a computing environment in various levels of detail. In particular, GAL is a descriptive markup language comprising formal declarations for linguistic dependency tree and attribute-value tree data consistent with a GDG. For an individual natural language, a GAL may describe the language's alphabet, syllabification, lexicon, morphology, syntax, inflection rules, and inflected forms, among others. For a pair of natural languages, a GAL may include lexical, morphological, and syntactic correspondence sections describing lexical correspondences between the two languages. In exemplary embodiments, linguistic systems and methods described herein may employ a grammar abstract language as described in the article by S. Diaconescu, "GRAALAN-Grammar Abstract Language Basics", *GESTS International Transactions on Computer Science and Engineering*, Vol. 10, No. 1 (2005).

FIGS. 25A-B show an exemplary GAL encoding of a lexicon declaration 302a-b stored in lexicon LKB 42 according to some embodiments of the present invention. The exemplary declaration represents the single-word lexicon entry "vesel" (a Romanian adjective meaning happy, content). Lexicon declaration 302a-b comprises a lemma declaration 302a and a supplement indicator 306 for each word supplement of the lemma. In some embodiments, lemma declaration 302a includes, among others, a text representation of the lemma in the Romanian language, a phonetic transcription, and a set of etymological and semantic indicators. In some embodiments, lemma declaration 302a also comprises an indicator of the inflection situation of the lemma.

In some embodiments, supplement indicator 306 includes a text representation of the respective supplement, and additional indicators such as syllabification patterns and a an indicator of the inflection situation of the respective supplement. In some embodiments, inflection situations of the lemma and supplements are encoded as AVTs, in a separate inflection declaration 304.

In some embodiments, LKB data including dependency tree data and attribute-value tree data may be formulated and stored in a low-level formal language such as an extensible markup language (XML). In some embodiments, a GAL compiler is configured to translate GAL declaration such as lexicon and inflection form declarations from GAL into XML format. For XML linguistic data, document type definitions (DTD) may be provided for each data type. FIGS. 26A-B illustrate an exemplary XML encoding of the lexicon declaration in FIGS. 25A-B according to some embodiments of the present invention.

FIG. 27 shows an exemplary GAL encoding of an inflection form declaration 402 stored in inflection forms LKB 44 according to some embodiments of the present invention (the example represents the analytic inflected form "un băiat", Romanian for "a boy"). Declaration 402 includes an AVT describing the respective inflection situation. For an analytic (multiword) inflection form, section 402 further includes a central word declaration 406 and a set of auxiliary word declarations 408. Declarations 406-408 comprise AVT declarations describing the inflection situation of each respective word. Declaration 408 may further include a relationship declaration 410 indicating the type of grammatical relationship between the central word and the respective auxiliary word.

Figure 28:
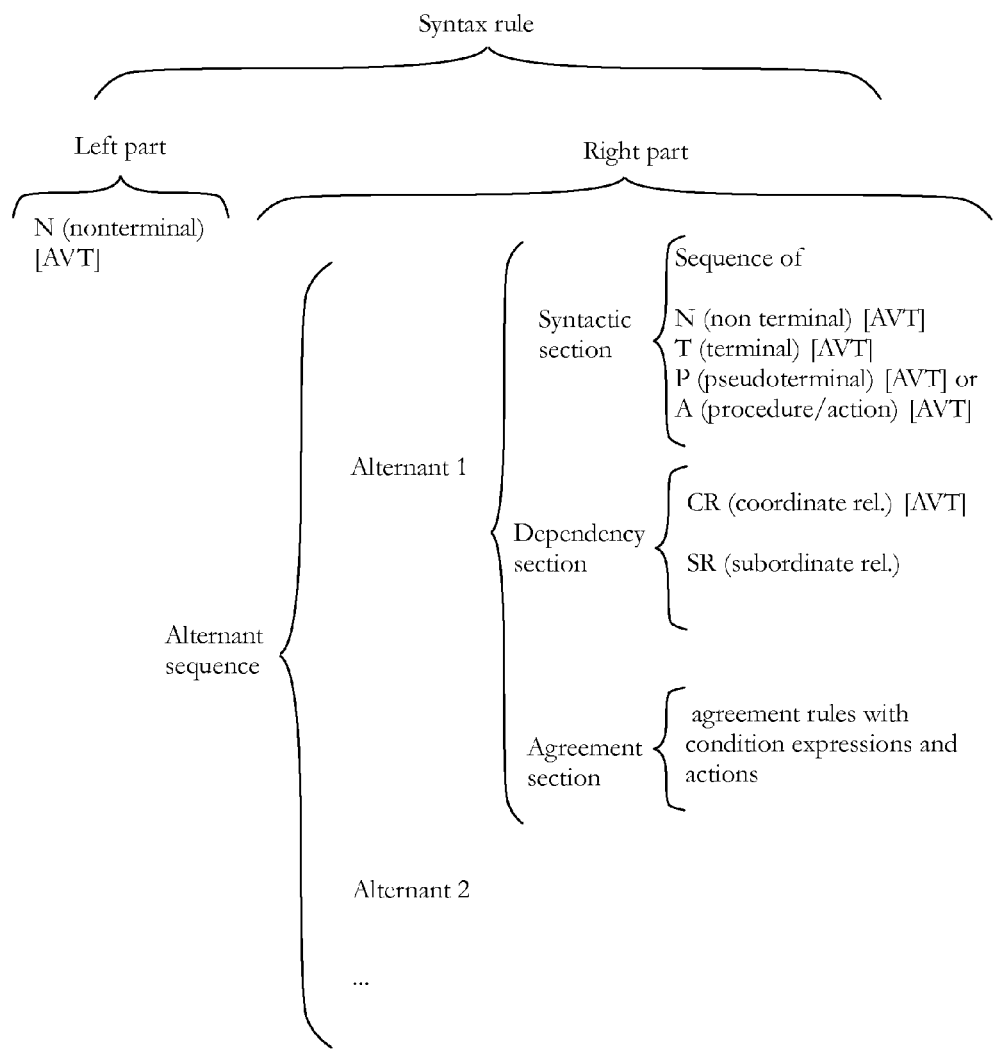
FIG. 28 shows an exemplary structure of a syntax rule declaration according to some embodiments of the present invention.

FIG. 28 shows an exemplary structure of a syntax rule declaration stored in syntax LKB 46 according to some embodiments of the present invention. In some embodiments, a syntax rule is defined according to a GDG, and has two parts: left and right. The left part of the rule contains a nonterminal node and an AVT. The AVT contains syntactic/lexical categories with their values. The right part of the rule contains a set of alternants, each representing a syntactically correct variation of a node. In some embodiments, each alternant is defined by a syntactic section, a dependency section and an agreement section. The syntactic section may comprise a sequence of nonterminal, terminal, pseudoterminal, or procedure/action nodes. The dependency section may comprise the description of the grammatical relationship between the nodes defined within the syntactic section. In some embodiments, grammatical relationships include coordination and subordination relations. In some embodiments, the agreement section comprises a set of agreement rules, wherein each agreement rule is an expression of type if(conditional expression) then(actions).

FIG. 29 shows an exemplary GAL encoding of a syntax rule declaration 502 stored in syntax LKB 46 according to some embodiments of the present invention. In some embodiments, declaration 502 includes a set of alternant declarations, each comprising syntax and dependency declarations.

The exemplary systems and methods described above allow the exploitation of linguistic knowledgebases comprising lexicon, inflected form, and syntactic data, for the purpose of, among other, annotating, spell checking, and grammar checking a piece of text. Various embodiments of the present invention can be used in a number of computer-based linguistic applications, such as word processors, thesauri, indexers, database applications, search engines, as well as tools for automated or machine-assisted translation.

Figure 30:
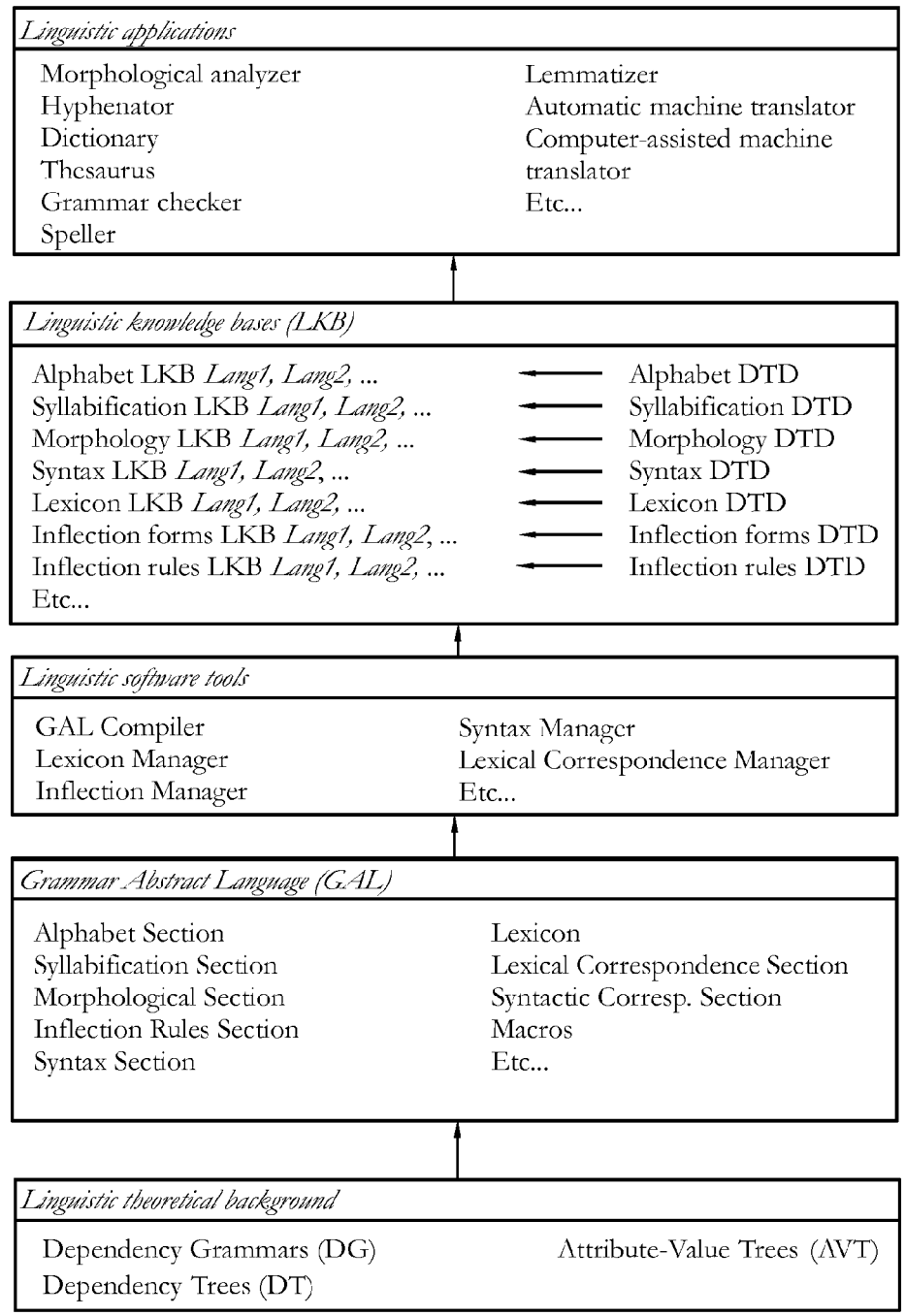
FIG. 30 shows a generic overview of LKB development comprising GAL knowledgebases and linguistic applications according to some embodiments of the present invention.

An exemplary linguistic knowledge base development environment including linguistic applications is shown in FIG. 30. Computer-based linguistic applications may be based on a theoretical background provided by a variety of linguistic representations, such as the dependency grammar models, dependency trees and attribute value trees discussed above. Starting from such grammatical representations of language, a formal grammar abstract language (GAL) may be developed. The GAL allows a systematic characterization of natural language using categories/sections such as alphabet, syllabification, morphology, syntax, inflection rules and forms, lexicon, as well as lexical, morphological, and syntactic correspondence sections. A number of linguistic software tools such as a GAL compiler and lexicon, inflection, syntax and lexical correspondence managers may be used to generate a number of linguistic knowledge bases (LKBs). For XML data, the LKBs may include associated DTDs. Exemplary LKBs may include alphabet, syllabification, morphology, syntax, inflection rules and forms, lexicon, as well as lexical, morphological, and syntactic correspondence LKBs. The LKBs may be employed in a variety of linguistic processing applications. Exemplary linguistic applications may include a morphological analyzer, hyphenator, dictionary, thesaurus, grammar and spell checker, search engine, indexer, and automatic and/or computer-assisted machine translators, among others.

It will be clear to one skilled in the art that the above embodiments may be altered in many ways without departing from the scope of the invention. Accordingly, the scope of the invention should be determined by the following claims and their legal equivalents.

What is claimed is:

1. A system comprising at least one computer configured to form:
   a linguistic knowledgebase (LKB) for a natural language, the LKB comprising a set of computer-readable lexicon declarations, a set of computer-readable inflected form declarations, and a set of computer-readable syntax rule declarations;
   a computer-implemented word retriever connected to the LKB and configured to:
      receive a first word,
      perform a lookup of an inflected form declaration of the first word in the LKB, in response to performing the lookup of the inflected form declaration, perform a lookup of a lexicon declaration of the first word in the LKB,
      determine a first word interpretation of the first word according to the lexicon declaration and the inflected form declaration, the first word interpretation comprising a lemma of the first word and an inflection indicator of the first word;
   a computer-implemented form generator connected to the word retriever and configured to:
      receive a second word not necessarily distinct from the first word,
      produce a first set of words, each word of the first set of words having a predetermined spelling similarity to the second word, and
      for each word of the first set of words, receive from the word retriever a second word interpretation of said each word of the first set of words;
   a computer-implemented synthetic annotator connected to the word retriever and configured to:
      receive a word sequence,
      for each word of the word sequence, receive from the word retriever a third word interpretation of said each word of the word sequence, and determine a synthetic annotation of the word sequence, the synthetic annotation comprising the third word interpretation of said each word of the word sequence; and a computer-implemented syntax checker connected to the synthetic annotator and configured to:
receive the synthetic annotation from the synthetic annotator,
perform a lookup of a syntax rule declaration of the word sequence in the LKB according to the synthetic annotation, and
perform a syntactic analysis of the word sequence according to the syntax rule declaration, to determine a synthetic dependency tree of the word sequence.

2. The system of claim 1, further comprising a computer-implemented speller connected to the word retriever and form generator and configured to receive the first word interpretation from the word retriever;
determine according to the first word interpretation whether the LKB includes the inflected form declaration of the first word;
when the LKB does not include the inflected form declaration, receive from the form generator a second set of words having a predetermined spelling similarity to the first word; and
display at least a word of the second set of words to a user.

3. The system of claim 1, further comprising a computer-implemented lemmatizer connected to the word retriever and configured to
receive the first word interpretation from the word retriever; and
display the lemma of the first word to a user.

4. The system of claim 1, further comprising a computer-implemented morphological analyzer connected to the synthetic annotator and syntax checker and configured to
receive the synthetic annotation from the synthetic annotator;
receive the synthetic dependency tree from the syntax checker;
determine an analytic annotation of the word sequence according to the synthetic annotation and the synthetic dependency tree, the analytic annotation comprising an analytic dependency tree of the word sequence, wherein a selected node of the analytic dependency tree comprises a plurality of nodes of the synthetic dependency tree; and
display to a user the analytic annotation or the analytic dependency tree.

5. The system of claim 1, further comprising a computer-implemented grammar checker connected to the syntax checker and configured to receive the synthetic dependency tree from the syntax checker; and
display the synthetic dependency tree to a user.

6. The system of claim 1, wherein the LKB comprises Grammar Abstract Language (GAL) or Extensible Markup Language (XML) code.

7. A method comprising:
employing a computer-implemented word retriever to:
receive a first word,
perform a lookup of an inflected form declaration of the first word in a linguistic knowledgebase (LKB) of a natural language, the LKB comprising a set of computer-readable lexicon declarations, a set of computer-readable inflected form declarations, and a set of computer-readable syntax rule declarations,
in response to performing the lookup of the inflected form declaration, perform a lookup of a lexicon declaration of the first word in the LKB,
determine a first word interpretation of the first word according to the lexicon declaration and the inflected form declaration, the first word interpretation comprising a lemma of the first word and an inflection indicator of the first word;
employing a computer-implemented form generator connected to the word retriever to:
receive a second word not necessarily distinct from the first word,
produce a first set of words, each word of the first set of words having a predetermined spelling similarity to the second word, and
for each word of the first set of words, receive from the word retriever a second word interpretation of said each word of the first set of words;
employing a computer-implemented synthetic annotator connected to the word retriever to
receive a word sequence,
for each word of the word sequence, receive from the word retriever a third word interpretation of said each word of the word sequence, and
determine a synthetic annotation of the word sequence, the synthetic annotation comprising the third word interpretation of said each word of the word sequence; and
employing a computer-implemented syntax checker connected to the synthetic annotator and configured to
receive the synthetic annotation from the synthetic annotator,
perform a lookup of a syntax rule declaration of the word sequence in the LKB according to the synthetic annotation, and
perform a syntactic analysis of the word sequence according to the syntax rule declaration, to determine a synthetic dependency tree of the word sequence.

8. The method of claim 7, further comprising, in response to determining the first set of words, displaying at least a word of the first set of words on a computer-implemented display device.

9. The method of claim 7, further comprising, in response to performing the lookup of the lexicon declaration of the first word, displaying the lemma of the first word on a computer-implemented display device.

10. The method of claim 7, further comprising, in response to determining the synthetic dependency tree, displaying the synthetic dependency tree on a computer-implemented display device.

11. The method of claim 7, further comprising, in response to determining the synthetic dependency tree, determining an analytic dependency tree of the word sequence according to the synthetic dependency tree, wherein a selected node of the analytic dependency tree comprises a plurality of nodes of the synthetic dependency tree.

12. The method of claim 11, further comprising, in response to determining analytic dependency tree, displaying the analytic dependency tree on a computer-implemented display device.

13. The method of claim 7, wherein the LKB comprises Grammar Abstract Language (GAL) or Extensible Markup Language (XML) code.

14. A non-transitory computer-readable medium encoding instructions which, when executed by a computer system comprising at least one computer, cause the computer system to form:

a linguistic knowledgebase (LKB) for a natural language, the LKB comprising a set of computer-readable lexicon declarations, a set of computer-readable inflected form declarations, and a set of computer-readable syntax rule declarations;

a computer-implemented word retriever connected to the LKB and configured to:
receive a first word,
perform a lookup of an inflected form declaration of the first word in the LKB,
in response to performing the lookup of the inflected form declaration, perform a lookup of a lexicon declaration of the first word in the LKB,
determine a first word interpretation of the first word according to the lexicon declaration and the inflected form declaration, the first word interpretation comprising a lemma of the first word and an inflection indicator of the first word;

a computer-implemented form generator connected to the word retriever and configured to:
receive a second word not necessarily distinct from the first word,
produce a first set of words, each word of the first set of words being a spelling variant of the second word having a predetermined spelling similarity to the second word, and
for each word of the first set of words, receive from the word retriever a second word interpretation of said each word of the first set of words;

a computer-implemented synthetic annotator connected to the word retriever and configured to:
receive a word sequence,
for each word of the word sequence, receive from the word retriever a third word interpretation of said each word of the word sequence, and
determine a synthetic annotation of the word sequence, the synthetic annotation comprising the third word interpretation of said each word of the word sequence; and a computer-implemented syntax checker connected to the synthetic annotator and configured to:
receive the synthetic annotation from the synthetic annotator,
perform a lookup of a syntax rule declaration of the word sequence in the LKB according to the synthetic annotation, and
perform a syntactic analysis of the word sequence according to the syntax rule declaration, to determine a synthetic dependency tree of the word sequence.

15. The non-transitory computer-readable medium of claim 14, wherein the instructions further cause the computer system to form a computer-implemented speller connected to the word retriever and form generator and configured to receive the first word interpretation from the word retriever;
determine according to the first word interpretation whether the LKB includes the inflected form declaration of the first word;
when the LKB does not include the inflected form declaration, receive from the form generator a second set of words having a predetermined spelling similarity to the first word; and
display at least a word of the second set of words to a user.

16. The non-transitory computer-readable medium of claim 14, wherein the instructions further cause the computer system to form a computer-implemented lemmatizer connected to the word retriever and configured to
receive the first word interpretation from the word retriever; and
display the lemma of the first word to a user.

17. The non-transitory computer-readable medium of claim 14, wherein the instructions further cause the computer system to form a computer-implemented morphological analyzer connected to the synthetic annotator and syntax checker and configured to
receive the synthetic annotation from the synthetic annotator;
receive the synthetic dependency tree from the syntax checker;
determine an analytic annotation of the word sequence according to the synthetic annotation and the synthetic dependency tree, the analytic annotation comprising an analytic dependency tree of the word sequence, wherein a selected node of the analytic dependency tree comprises a plurality of nodes of the synthetic dependency tree; and
display to a user the analytic annotation or the analytic dependency tree.

18. The non-transitory computer-readable medium of claim 14, wherein the instructions further cause the computer system to form a computer-implemented grammar checker connected to the syntax checker and configured to
receive the synthetic dependency tree from the syntax checker; and
display the synthetic dependency tree to a user.

19. The non-transitory computer-readable medium of claim 14, wherein the LKB comprises Grammar Abstract Language (GAL) or Extensible Markup Language (XML) code.

* * * * *